US008694323B2

(12) United States Patent
Hataoka et al.

(10) Patent No.: US 8,694,323 B2
(45) Date of Patent: Apr. 8, 2014

(54) IN-VEHICLE APPARATUS

(75) Inventors: Nobuo Hataoka, Sagamihara (JP); Hiroaki Kokubo, Higashimurayama (JP); Takeshi Homma, Fuchu (JP); Hirohiko Sagawa, Kokubunji (JP); Hisashi Takahashi, Sagamihara (JP)

(73) Assignee: Xanavi Informatics Corporation, Kanagawa-ken (JP)

( * ) Notice: Subject to any disclaimer, the term of this patent is extended or adjusted under 35 U.S.C. 154(b) by 1525 days.

(21) Appl. No.: 11/826,161

(22) Filed: Jul. 12, 2007

(65) Prior Publication Data
US 2008/0059199 A1 Mar. 6, 2008

(30) Foreign Application Priority Data

Sep. 4, 2006 (JP) ................................. 2006-239012

(51) Int. Cl.
*G10L 21/00* (2013.01)
(52) U.S. Cl.
USPC ......................................................... 704/275
(58) Field of Classification Search
CPC .... G06F 3/013; G06F 3/005; G06F 17/30247
USPC ......................................................... 704/275
See application file for complete search history.

(56) References Cited

U.S. PATENT DOCUMENTS

| 7,865,306 B2 * | 1/2011 | Mays | 701/211 |
|---|---|---|---|
| 2003/0009281 A1 * | 1/2003 | Whitham | 701/211 |
| 2003/0155413 A1 * | 8/2003 | Kovesdi et al. | 235/375 |
| 2005/0073136 A1 * | 4/2005 | Larsson et al. | 280/735 |
| 2005/0192025 A1 * | 9/2005 | Kaplan | 455/456.1 |
| 2006/0087453 A1 * | 4/2006 | Iwane | 340/988 |
| 2006/0187305 A1 * | 8/2006 | Trivedi et al. | 348/169 |
| 2007/0237318 A1 * | 10/2007 | McGary | 379/114.15 |
| 2007/0296572 A1 * | 12/2007 | Fein et al. | 340/539.13 |
| 2008/0009268 A1 * | 1/2008 | Ramer et al. | 455/412.1 |
| 2008/0102858 A1 * | 5/2008 | Giniger et al. | 455/456.3 |
| 2009/0030605 A1 * | 1/2009 | Breed | 701/208 |

FOREIGN PATENT DOCUMENTS

| JP | 2005-173109 | 12/2003 |
|---|---|---|
| JP | 2004-109468 | 4/2004 |
| JP | 2005-267092 | 9/2005 |

OTHER PUBLICATIONS

Office Action from Japanese Patent Office for corresponding Japanese Patent Application No. JP-2006-239012, dated Mar. 15, 2011.

\* cited by examiner

*Primary Examiner* — Jakieda Jackson
(74) *Attorney, Agent, or Firm* — Stites & Harbison PLLC; Nicholas B. Trenkle

(57) ABSTRACT

The present invention provides a technique, by speech input, to specify a location, even when a name or the like of the location is not accurately known, while driving. An in-vehicle apparatus mounted in a vehicle has a speech recognition function, and stores information shown on a signboard and a noun substitute in storage. If speech inputted from a speech input device includes a noun substitute and further includes at least a part of the information shown on the signboard, a response is decided according to the information shown on the signboard, and the decided response is outputted from an output device.

4 Claims, 13 Drawing Sheets

FIG. 3

| ID | IMAGE | CHARACTER STRING | ... |
|---|---|---|---|
| XXX-01 | 😀 | SUPERMARKET XXX | ... |
| XXX-02 | ★ | YY CONVENIENCE STORE | ... |
| ... | ... | ... | ... |

| ID | SIGNBOARD POSITION | CHARACTER STRING | ... |
|---|---|---|---|
| 11111 | (X1,Y1) | ITALIAN RESTAURANT | ... |
| 11112 | (X2,Y2) | AA ROAD 5 km AHEAD | ... |
| 11113 | (X3,Y3) | XX HOT SPRING RESORT | ... |
| 11114 | (X4,Y4) | YY CONVENIENCE STORE | ... |
| ... | ... | ... | ... |

253
401 402 403

254

| IMAGE-TAKING POSITION | ID | CHARACTER STRING | SECOND ID | DIALOGUE SCENARIO | ... |
|---|---|---|---|---|---|
| (X11,Y11) | XYZ-0001 | XY BUILDING | — | — | ... |
| (X11,Y11) | XYZ-0002 | AA ROAD 5 km AHEAD | 11112 | XYZ | ... |
| (X11,Y11) | XYZ-0003 | YY CONVENIENCE STORE | 11114 | XYZ | ... |
| (X11,Y11) | XYZ-0004 | QQ | — | — | ... |
| (X11,Y11) | XYZ-0005 | XX HOT SPRING RESORT | 11113 | XYZ | ... |
| ... | ... | ... | ... | ... | ... |
| (X12,Y12) | XZZ-0001 | ZZ BUILDING | — | — | ... |
| (X12,Y12) | XZZ-0002 | ZZ ENTRANCE | 22222 | — | ... |
| ... | ... | ... | ... | ... | ... |

501 502 503 504 505

256

601

| NOUN SUBSTITUTE |
|---|
| THIS |
| JUST NOW |
| THAT |
| ... |

FIG. 16

| NOUN SUBSTITUTE | DIRECTION |
|---|---|
| THIS | FORWARD/BACKWARD |
| JUST NOW | BACKWARD |
| THAT | FORWARD/BACKWARD |
| ... | ... |

1511
1601
1602

IN-VEHICLE APPARATUS

CLAIM OF PRIORITY

This application claims priority from Japanese Patent Application No. 2006-239012 filed on Sep. 4, 2006, the contents of which are incorporated herein by reference.

BACKGROUND OF THE INVENTION

1. Field of the Invention

The present invention relates to an in-vehicle apparatus.

2. Description of the Related Art

In conventional technology, there are various information service systems, for instance, car navigation systems, utilizing speech input as a user interface. In the conventional art, the speech data is inputted in the form of words, or fixed expressions. By way of example, when the speech data is used to input a destination to a car navigation system, a synthetic speech is issued from the car navigation system, saying "Enter a destination, please", and a user gives a vocal response, saying "XX hot-spring resort". The car navigation then system recognizes the term "XX hot-spring resort" through a speech-recognition technique, and conducts a route search after setting this hot-spring resort as the destination.

Japanese Patent Laid-open Publication No. 2005-173109, hereinafter referred to as "Patent Document 1", describes a technique that allows the car navigation system to narrow down a range of vocabulary which the user may utter next, base on a captured image.

SUMMARY OF THE INVENTION

As described above, in the conventional speech input, it is necessary to accurately utter a name of place for input, such as "XX hot-spring resort". However, in actual usage, there are cases in which, while a user is driving, he or she happens to see a signboard indicating a retail-store, a tourist spot, or the like, and the user may feel like going via the location indicated by the signboard. In this situation, it may be difficult for the user to accurately figure out the name or the like of the location, due driving at a high speed.

The present invention has been made in view of the situation above, and an object of the invention is to provide a technique for specifying a location, during the speech input operation, even though a name or the like of the location is not accurately identifiable, upon glancing at such information while driving. Another object of the present invention is to allow interactive processing, taking the information indicated by a signboard into account.

The present invention has been made to achieve the objects above, and it is directed to an in-vehicle apparatus that includes storage to store signboard information containing a character string shown on the signboard, and based on the character string and signboard information included in speech, the apparatus outputs a response appropriate for the speech.

In addition, the present invention is directed to an in-vehicle apparatus that is mounted in a vehicle and provided with a speech recognition function, including a signboard information storing means that stores information shown on a signboard, a noun substitute storing means that stores a noun substitute, a speech input means, a response processing means that decides a response appropriate for the information shown on the signboard, when the speech inputted by the speech input means contains the noun substitute and at least a part of the information shown on the signboard, and an outputting means that outputs the determined response, from an output device.

According to the technique of the present invention, in the speech input operation, it is possible to specify a location, even though a name or the like of the location is not accurately identifiable upon glancing at such information while driving. In addition, this technique allows interactive processing, taking the information indicated by the signboard into account.

BRIEF DESCRIPTION OF THE DRAWINGS

FIG. 3 illustrates an example of recognition image information in the embodiment of the present invention;

FIG. 4 illustrates an example of signboard information in the embodiment of the present invention;

FIG. 16 illustrates an example of the noun substitute information in the second embodiment of the present invention.

DETAILED DESCRIPTION OF PREFERRED EMBODIMENTS

Hereinafter, one embodiment of the present invention will be explained in detail, referring to the accompanying drawings.

First Embodiment

The first embodiment will be explained.

In the embodiment explained in the following, an information processor such as a navigation system, stores information indicated by a signboard installed in proximity to a road where a vehicle is driving, the information processor being mounted on the vehicle. The information shown on the signboard may be a retail-store name, a place name, an available service, or the like. In this example, this information is referred as "signboard information". The information processor according to the present embodiment determines whether or not an input speech uttered by a user contains a noun substitute and a part of the signboard information. As a result of the determination, if such information is contained, the information processor gives an interactive response and identifies which signboard is indicated by the noun substitute. Accordingly, even though a formal name or the like is not identifiable, it is possible to specify which retail-store, location, or service has been indicated.

Here, the signboard information used for the determination may be previously stored in storage of the information processor itself. In the present embodiment, it is assumed that in addition to the signboard information previously stored in the storage, the signboard information may be acquired in the following ways: acquired from an image taken by a camera, transmitted from a beacon transmitter, read from signboard information held by an RFID (Radio Frequency Identification System), or transmitted via a communication network such as the Internet. Further, in the present embodiment, if the signboard is specified by interactive response, a request to made to an external device, for detailed information regarding the place name, the retail-store, the tourist spot or the like, shown on the signboard.

Figure 1:
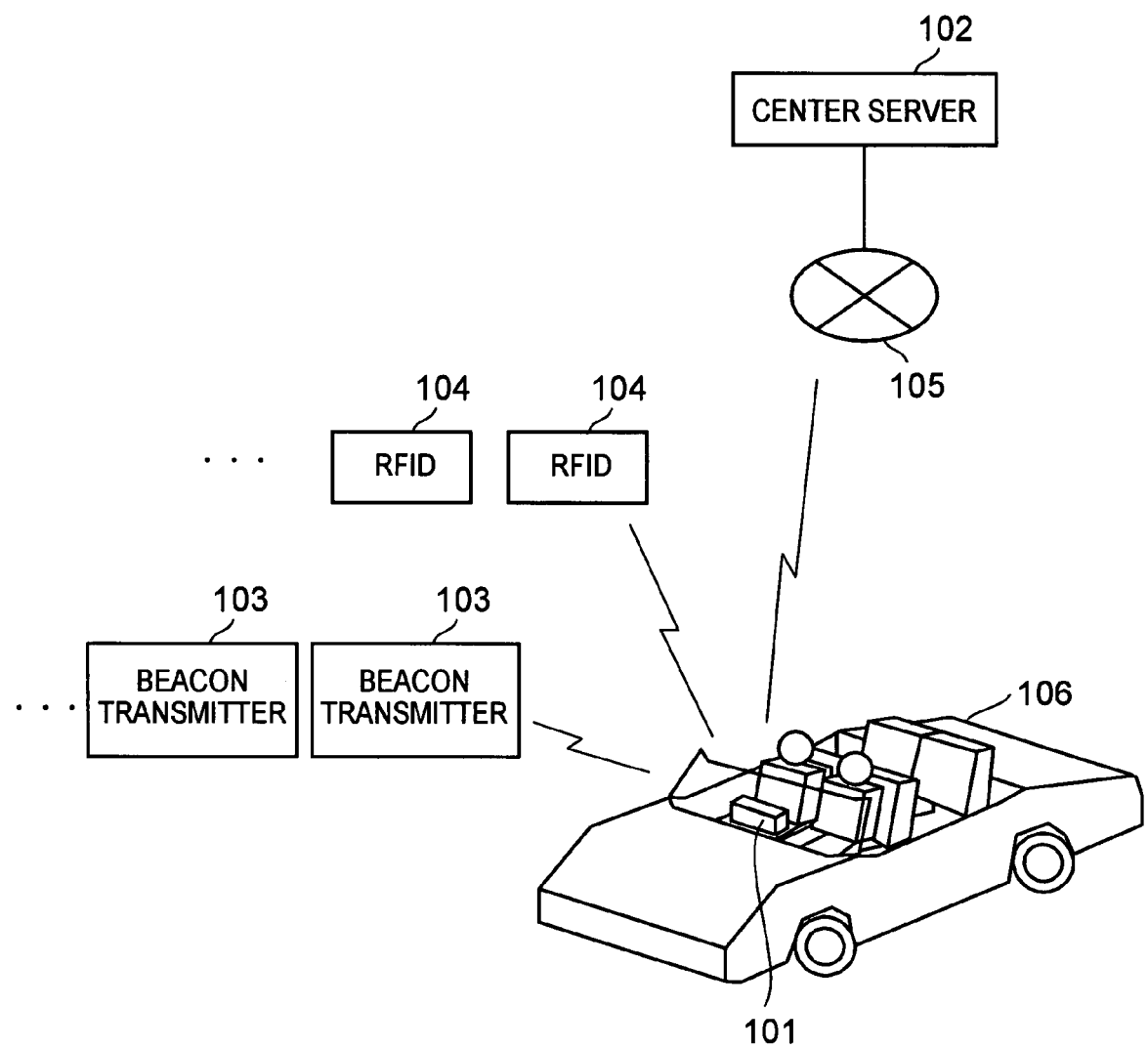
FIG. 1 illustrates a system configuration example in an embodiment of the present invention.

With reference to FIG. 1, a system configuration example of the first embodiment will be explained.

FIG. 1 illustrates one embodiment of an in-vehicle information service system configuration to which the present invention is applied. The system of the present embodiment includes an in-vehicle apparatus 101, a center server 102, a beacon transmitter 103, RFID 104, and the like. The in-vehicle apparatus 101 and the center server 102 are connected via a communication network 105 such as the Internet. Communication between the in-vehicle apparatus 101 and the beacon transmitter 103 is established by radio communication. Communication between the in-vehicle apparatus 101 and the RFID 104 is also established by radio communication. The in-vehicle apparatus 101 is mounted on a vehicle 106.

The in-vehicle apparatus 101 is, by way of example, an information processor such as a navigation system. The in-vehicle apparatus 101 is provided with a microphone, a speaker, a camera, an image processing function, a noise suppression function, a speech recognition function, a speech synthesis function, an dialogue management function, and the like.

The center server 102 stores in advance detailed information and signboard information in storage (not illustrated). Here, in this example, the detailed information is assumed to be POI (Point of Interest) for instance, which includes a name of place, a location or the like of a spot such as a retail-store or a tourist spot, which are described on a signboard located at a position visible to a user who is driving on a road. The signboard information is assumed to be a character string indicating, retail-store name, place name, an available service, or the like. Upon accepting a request, the center server 102 transmits the POI information to the in-vehicle apparatus 101, via the communication network 105. The center server 102 also transmits the signboard information.

The beacon transmitter 103 sends the signboard information and the like, to the vehicle that has entered an area in which communication is available.

The RFID 104 is installed on a signboard, in a retail-store, or the like. The RFID stores the signboard information in storage (not illustrated).

The in-vehicle apparatus 101 stores the signboard information in storage (not illustrated) in advance. The in-vehicle apparatus 101 receives the signboard information transmitted from the center server 102, and further receives the signboard information transmitted from the beacon transmitter 103. In addition, the in-vehicle apparatus 101 reads the signboard information held by the RFID 104. The in-vehicle apparatus 101 further subjects image data taken by the camera to image processing, and obtains the signboard information from a signboard within an area visible to the user.

When an utterance of the user is inputted by the microphone, the in-vehicle apparatus 101 performs speech recognition on the utterance, and determines whether or not the speech contains a predetermined noun substitute. As a result of the determination, if a predetermined noun substitute is contained, the in-vehicle apparatus 101 further determines whether or not a word contained in the utterance, in addition to the noun substitute, matches a character string included in the signboard information stored in the storage, or a character string included in the signboard information obtained from the center server 102, the beacon transmitter 103, the RFID 104, or the like. According to the determination above, the in-vehicle apparatus 101 outputs a response in a form of synthesized speech from the speaker. In addition, the in-vehicle apparatus 101 transmits, to the center server 102, a request for the POI information.

Next, a configuration example of each element will be explained in detail.

A configuration example of the in-vehicle apparatus 101 will be explained with reference to FIG. 2.

Figure 2:
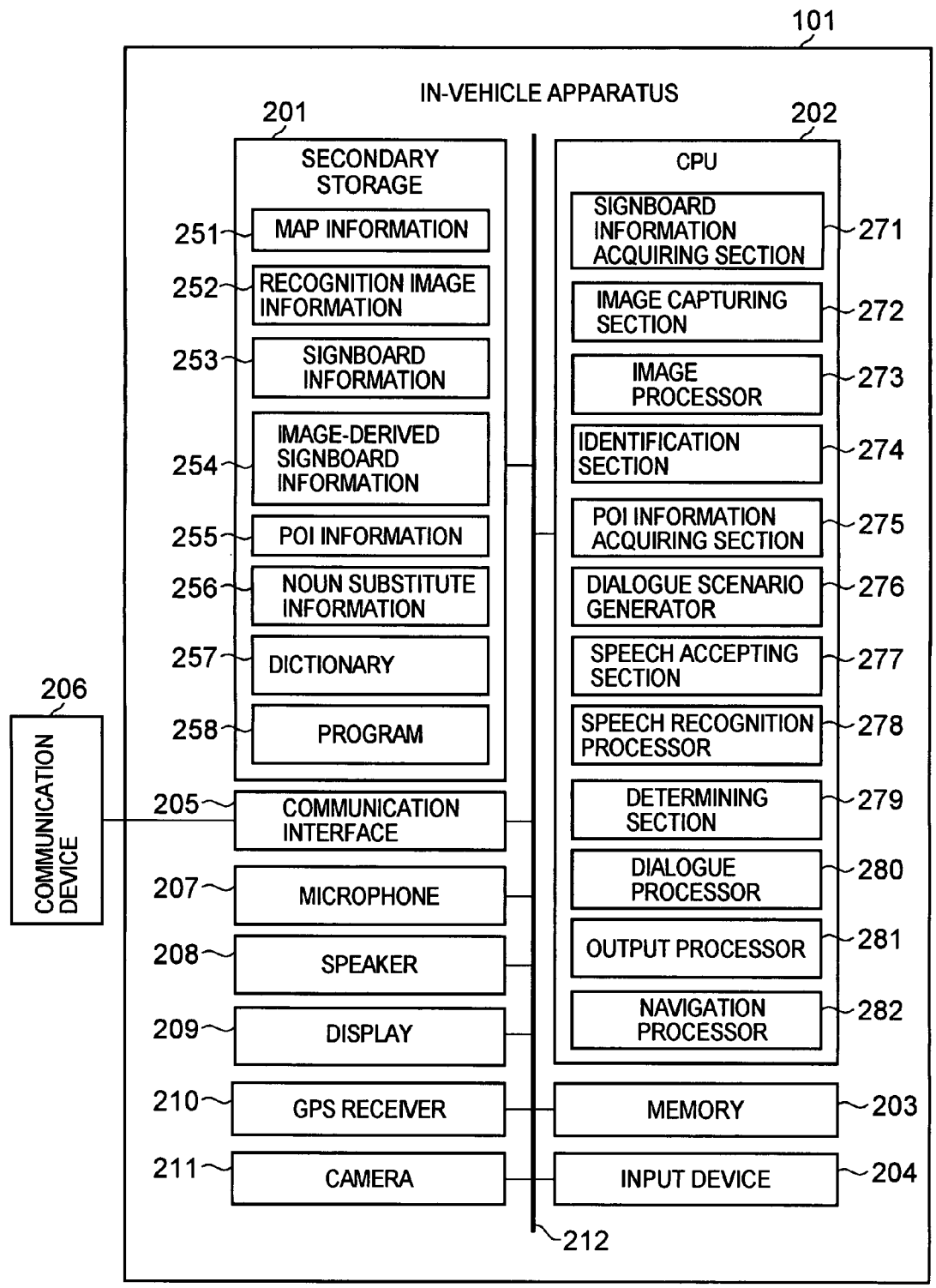
FIG. 2 illustrates a configuration example of an in-vehicle apparatus in the embodiment of the present invention.

In FIG. 2, the in-vehicle apparatus 101 is a navigation system, for example. The in-vehicle apparatus 101 is provided with secondary storage 201, a CPU (Central Processing Unit) 202, a memory 203, an input device 204, a communication interface 205, a communication device 206, a microphone 207, a speaker 208, a display 209, a GPS (Global Positioning System) receiver 210, a camera 211, and the like. The secondary storage 201, CPU 202, memory 203, input device 204, communication interface 205, communication device 206, microphone 207, speaker 208, display 209, GPS receiver 210, camera 211, and the like are connected via a bus 212 or the like.

The secondary storage 201 may include a storage medium such as a CD-R (Recordable Compact Disc), DVD-RAM (Digital Versatile Disk-Random Access Memory) a drive unit for the storage medium, a HDD (Hard Disk Drive), or the like. The secondary storage 201 stores map information 251, recognition image information 252, signboard information 253, image-derived signboard information 254, POI information 255, noun substitute information 256, a dictionary 257, a program 258, and the like.

The map information 251 is information including road data, building locations, and the like, and it is the same as the map used in a conventional navigation system. The recognition image information 252 is prepared for processing an image, such as a logo and a trademark, taken by the camera 211, to acquire the signboard information of surrounding signboards. The signboard information 253 is information obtained from the center server 102, the beacon transmitter 103, the RFID 104, and the like, according to the operation example as described below. The image-derived signboard information 254 is information of surrounding signboards, obtained by processing an image taken by the camera 211. The POI information 255 is information obtained from the center server 102 according to the operation example as described below. The POI information may be conventional POI information, and it may include a position on the map, such as a tourist spot, retail-store, and the like. The noun substitute information 256 includes a noun substitute that is used to determine whether or not a question regarding the signboard is included in the utterance of the user. The dictionary 257 is a dictionary used for speech recognition. The dictionary 257 contains words, and information indicated by the words, such as route searching, setting of destination and routing, retrieving, agreeing, negating, and the like, and this correspondence dictionary is the same as is used in conventional technology. The program 258 is a program to implement functions described below.

The CPU 202 executes the program 258, thereby implementing a signboard information acquiring section 271, an image capturing section 272, an image processor 273, an identification section 274, a POI information acquiring section 275, a dialogue scenario generator 276, a speech accepting section 277, a speech recognition processor 278, a determining section 279, an dialogue processor 280, an output processor 281, a navigation processor 282, and the like.

The signboard information acquiring section 271 obtains a signboard information item from the center server 102, the beacon transmitter 103, the RFID 104, or the like, and stores the information item in the signboard information 253. The image capturing section 272 captures an image taken by the camera 211. The image processor 273 obtains a signboard information item, based on the information of a logo, a trademark, and the like, within the recognition image information 252, and a result of the image processing to which the image captured by the image capturing section 272 has been subjected. In addition, the image processor 273 subjects the image captured by the image capturing section 272 to the image processing to obtain a character string, and acquires a signboard information item. The image processor 273 stores the signboard information item having been acquired according to the above procedure, in the image-derived signboard information 254. The identification section 274 compares the image-derived signboard information 254 with the signboard information 253, and obtains a signboard information item indicating an identical signboard. The POI information acquiring section 275 obtains a POI information item from the center server 102. The dialogue scenario generator 276 generates an dialogue scenario based on the POI information item and the signboard information item. It is to be noted that a technique to send and receive information including speech data as input is not particularly restricted, and it may be implemented by a conventional technique, for example, VoiceXML (eXtensible Markup Language). A process in which the POI information acquiring section 275 requests a POI information item from the center server 102 according to the speech inputted may be one example of the above technique. The speech accepting section 277 accepts the speech uttered by the user. The speech recognition processor 278 converts the speech data accepted by the speech accepting section 277 into text data. Processing in this speech recognition processor 278 is the same as the processing in conventional art. The determining section 279 makes a determination according to a result as to whether or not a noun substitute within the noun substitute information 256 is included in the character string that has been converted by the speech recognition processor 278. In particular, in the present embodiment, the determining section 279 further determines whether or not the character string includes an information item relating to the signboard information 253 or the image-derived signboard information 254. The dialogue processor 280 decides a response for processing before that. According to this configuration, it is possible to determine whether or not the user utterance is for a signboard, based on the result of whether or not the user utterance includes a noun substitute indicating the information contained in the taken image. If it is determined that the user utterance relates to the signboard, an dialogue scenario for the signboard is generated, so that an interactive process can be performed according to this dialogue scenario. A technique to implement this type of function of the dialogue processor 280 is not particularly limited, and it may be implemented by a conventional technique, such as SRGS (Speech Recognition Grammar Specification) or a grammar file. The output processor 281 outputs a response based on a decision of the dialogue processor 280. The navigation processor 282 requests a POI information item from the center server 102.

The input device 204 may, for example, be a button, a remote controller and remote-control receiver, a touch panel, and the like. The communication device 206 is connected to the bus 212 via the communication interface 205. The communication device 206 may be a beacon receiver, a portable telephone, an RFID antenna, an RFID reader, and the like. The GPS receiver 210 receives a signal from a GPS satellite (not illustrated). The camera 211 takes an image of surroundings of the vehicle. In the present embodiment, the camera 211 is capable of taking surrounding images of 180 degrees ahead of the vehicle, by the use of a fisheye lens, or the like, for instance. This camera 211 may be provided particularly for the function described below. Alternatively, by way of example, a camera provided for another purpose, such as lane keeping, may serve as this camera 211.

Next, details of each information item stored in the in-vehicle apparatus 101 will be explained.

Firstly, the map information 251 will be explained.

The map information 251 is assumed to have latitude and longitude, with XY coordinates based on the latitude and longitude. The map information 251 contains image data, road data, place-name data, address data, phonebook data, and the like, of multiple maps including coordinate information. The place-name data stores map locations and names of places on the respective locations, in such a manner that one is associated with the other. The address data stores map locations and addresses, in such a manner that one is associated with the other. The phonebook data stores phone numbers, company or individual names relating to the phone numbers, map locations of the companies or the individuals, in such a manner that they are respectively associated with one another.

The map information 251 may be information that is used by a conventional navigation system to calculate a current position, to search a route, and the like. Alternatively, it may be information used for a function that will be explained below.

Next, an example of the recognition image information 252 will be explained with reference to FIG. 3.

It is assumed that an information item within the recognition image information 252 is stored in advance in the secondary storage 201. However, there is no limitation to this configuration, and an information item may be added, modified, or the like, according to the information inputted via the input device 204, the communication device 206, or the like. In addition, this information item may be transmitted from the center server 102.

The information item within the recognition image information 252 may be an image or the like, representing a retail-store, service, or the like, on a signboard, such as a logo and a trademark. An example in FIG. 3 shows the recognition image information 252 including an ID 301, an image 302, a character string 303, and the like. The ID 301, the image 302, the character string 303, and the like, registered in each line, are associated with one another. The ID 301 is identification information for a logo, a trademark, and the like, on a signboard, to represent a retail-store, a service, and the like. The image 302 is an image of the logo, trademark, and the like, associated with the ID 301. The character string 303 indicates a name of the service, retail-store, or the like, represented by the image 302.

It is to be noted here that in the example shown in FIG. 3, one table includes multiple combinations of the ID, the image, the character string, and the like. However, the configuration is not limited to this example. It is also possible that one table stores one combination of the ID, the image, the character string, and the like, and a number of such tables may be prepared, where the number corresponds to the number of recognition image information items.

An example of the signboard information 253 will be explained with reference to FIG. 4.

An example of the information items within the signboard information 253 is shown in FIG. 4, and those items include an item stored in the secondary storage 201 in advance, an item transmitted from the center server 102, an item transmitted from the beacon transmitter 103, and an item read from the RFID 104.

In FIG. 4, the signboard information 253 includes an ID 401, a signboard position 402, a character string 403, and the like. The ID 401, the signboard position 402, the character string 403, and the like, registered in each line, are associated with one another. The ID 401 is identification information for the signboard. The signboard position 402 indicates a position where the signboard associated with the ID 401 is located. The character string 403 indicates a character described on the signboard associated with the ID 401, a name of service, retail-store, and the like, represented by a logo, a trademark or the like, which are described on the signboard associated with the ID 401.

It is to be noted here that in the example shown in FIG. 4, one table includes multiple combinations of the ID, the signboard position, the character string, and the like. However, the configuration is not limited to this example. It is also possible that one table stores one combination of the ID, the signboard position, the character string, and the like, and a number of such tables may be prepared, where the number corresponds to the number of signboard information items.

One example of the image-derived signboard information 254 will be explained with reference to FIG. 5.

The in-vehicle apparatus 101 obtains the information items within the image-derived signboard information 254, from an image captured, according to an operation described below. In FIG. 5, the image-derived signboard information 254 includes an image-taking position 501, an ID 502, a character string 503, second ID 504, a dialogue scenario 505, and the like. The image-taking position 501, the ID 502, the character string 503, the second ID 504, the dialogue scenario 505, and the like, registered in each line, are associated with one another. The image-taking position 501 indicates a position where the image was taken. The ID 502 is identification information to identify a signboard, a building, or the like, extracted from the image taken at the associated image-taking position 501. The character string 503 represents a character string extracted from the signboard, the building, or the like, associated with the ID 502, and a service, a retail-store, and the like represented by a logo, a trademark, or the like, shown on the signboard associated with the ID 502. The second ID 504 is the ID 401 within the signboard information 253, which indicates the same signboard as the signboard associated with the ID 502. The dialogue scenario 505 is an dialogue scenario that is used when there is an interaction with the user regarding the signboard associated with the ID 502. This dialogue scenario 505 is generated by the in-vehicle apparatus 101 according to the operation example as described below.

Figures 5, 6:
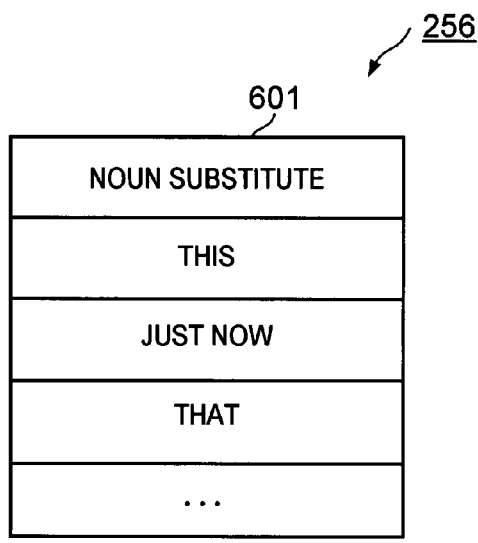
FIG. 5 illustrates an example of image-derived signboard information in the embodiment of the present invention.
FIG. 6 illustrates an example of noun substitute information in the embodiment of the present invention.

In the example of FIG. 5, a record having "-" in the field of the second ID 504 indicates that there is no ID 401 in the signboard information 253, representing the same signboard associated with the ID 502. A signboard information item within the image-derived signboard information 254 is obtained from the image, according to the operation example as described below. However, the information obtained from the image may also include information items that are hardly used by the user, such as a general name of building, erroneous recognition, and the like. Such information may not include the aforementioned POI information. The second ID 504 "-" in the example of FIG. 5 represents this situation.

In addition, in the example of FIG. 5, a record having "-" in the field of the dialogue scenario 505 indicates that there is no dialogue scenario according to the character string shown on the signboard that is associated with the ID 502.

In the example of FIG. 5, one table includes multiple combinations of the image-taking position, the ID, the character string, the identification, the scenario, and the like. However the configuration is not limited to this example. It is also possible that one table stores one combination of the image-taking position, the ID, the character string, the second ID, the dialogue scenario, and the like, and a number of such tables may be prepared, where the number corresponds to the number of image signboard information items.

It is assumed here that POI information 255 is obtained from the center server 102 according to the operation example as described below. Since the POI information 255 is identical to the POI information 852 described below, an explanation will not given here.

An example of the noun substitute information 256 will be explained with reference to FIG. 6.

It is assumed that an information item within the noun substitute information 256 is stored in advance in the secondary storage 201. However, it is not limited to this configuration, and an information item may be added, modified, or the like, according to the information inputted via the input device 204, the communication device 206, or the like. In addition, this information item may be transmitted from the center server 102.

In FIG. 6, the noun substitute information 256 may include a noun substitute 601, and the like. The noun substitute 601 is a noun substitute that is extracted from the speech uttered by the user.

Next, an example of system architecture of the in-vehicle apparatus 101 will be explained with reference to FIG. 7.

Figure 7:
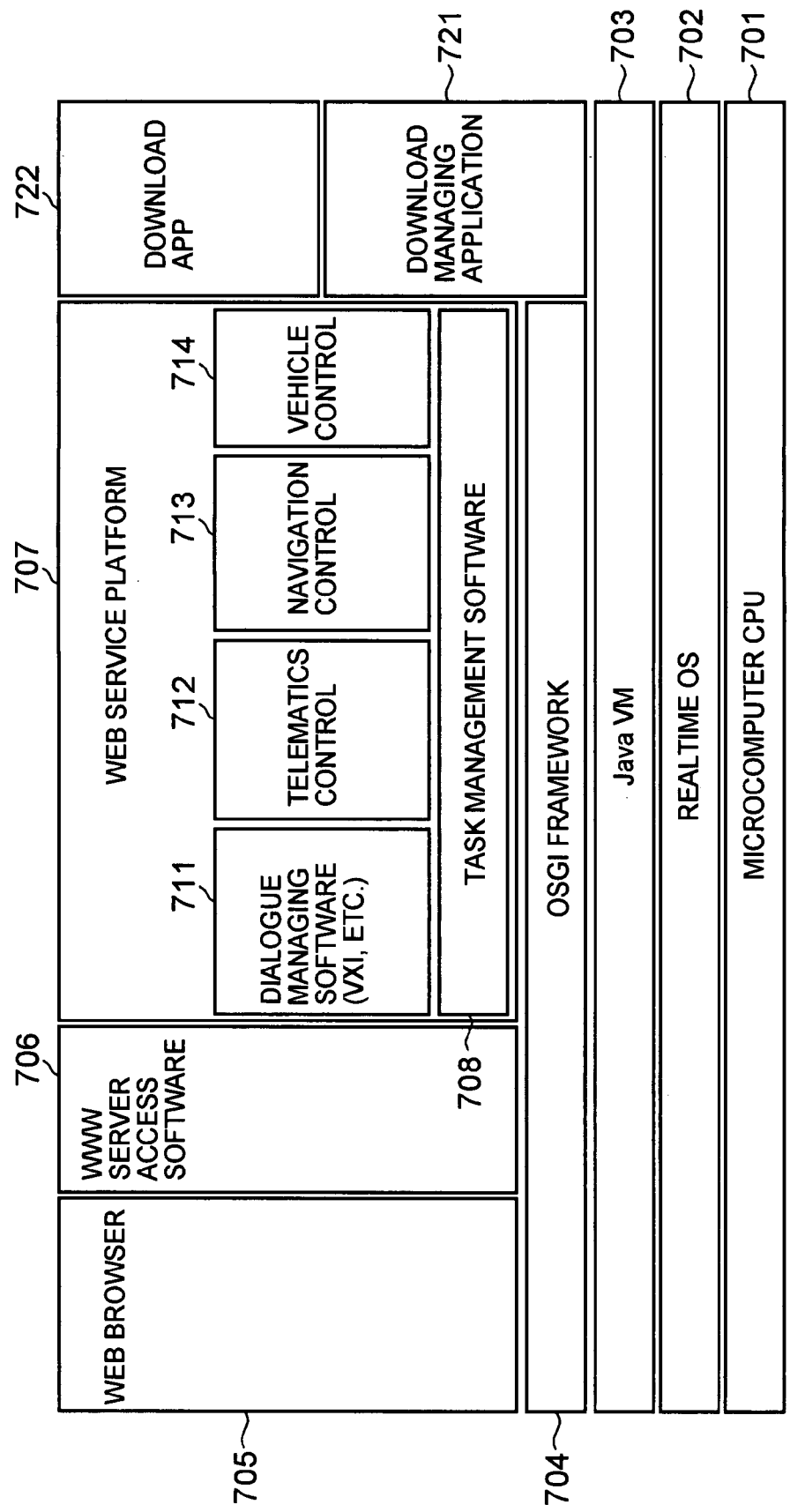
FIG. 7 illustrates a configuration example of the in-vehicle apparatus in the embodiment of the present invention.

In FIG. 7, the in-vehicle apparatus 101 incorporates a CPU 701, a Realtime OS (Operating System) 702, JAVA VM 703, OSGI (Open Service Gateway Initiative) framework 704, Web browser 705, WWW (World Wide Web) server access software 706, Web service platform 707, task management software 708, download managing application 721, download APP (Application Program Package) 722, and the like.

The CPU 701, the Realtime OS 702, the JaVaVM 703, the OSGI framework 704, the Web browser 705, the WWW server access software 706, and the like are basic platforms.

The Web service platform 707 incorporates various application programs. Such various application programs may include, for example, dialogue managing software 711, telematics control 712, navigation control 713, vehicle control 714, and the like. This dialogue managing software 711 includes VXI (VoiceXML Interpreter). These elements relate to the present embodiment which will be explained in the following.

The download managing application 721 and the download APP (Application Program Package) 722 are functions to access the center server 102 and to download data.

Next, a configuration example of the center server 102 will be explained with reference to FIG. 8.

The center server 102 incorporates a secondary storage 801, a CPU 802, a memory 803, an input device 804, an output device 805, a communication interface 806, and the like. The secondary storage 801, the CPU 802, the memory 803, the input device 804, the output device 805, the communication interface 806, and the like, are connected with one another via a bus 807.

The secondary storage 801 may include, for example, a storage medium such as CD or DVD, a drive unit for the storage medium, a HDD, or the like. The secondary storage 801 stores signboard information 851, POI information 852, a program 853, and the like. The signboard information 851 stores a signboard information item. Since this signboard information includes the same elements as the aforementioned signboard information 253, an explanation will be omitted. The POI information 852 stores a POI information item. This POI information 852 is the same as the POI information 255 described above. The program 853 is to implement the functions which will be described below.

The input device 804 may include, for example, a keyboard, a mouse, a microphone, or the like. The output device 805 may include, for example, a display, a printer, a speaker, and the like. The center server 102 is connected to the communications network 105, by way of the communication interface 806.

The CPU 802 executes the program 853, thereby implementing a signboard information transmitter 871, a POI information request accepting section 872, a POI information searching section 873, a POI information transmitter 874, and the like. The signboard information transmitter 871 transmits a signboard information item read from the signboard information 851, in response to the request from the in-vehicle apparatus 101. The POI information request accepting section 872 accepts a POI information request from the in-vehicle apparatus 101. The POI information searching section 873 searches the POI information 852 for a POI information item requested. The POI information transmitter 874 transmits the POI information item retrieved by the POI information searching section 873, to the in-vehicle apparatus 101.

Next, details of the information items in the secondary storage 801 will be explained.

An example of the POI information 852 and the POI information 255 will be explained with reference to FIG. 9.

Figures 8, 9:
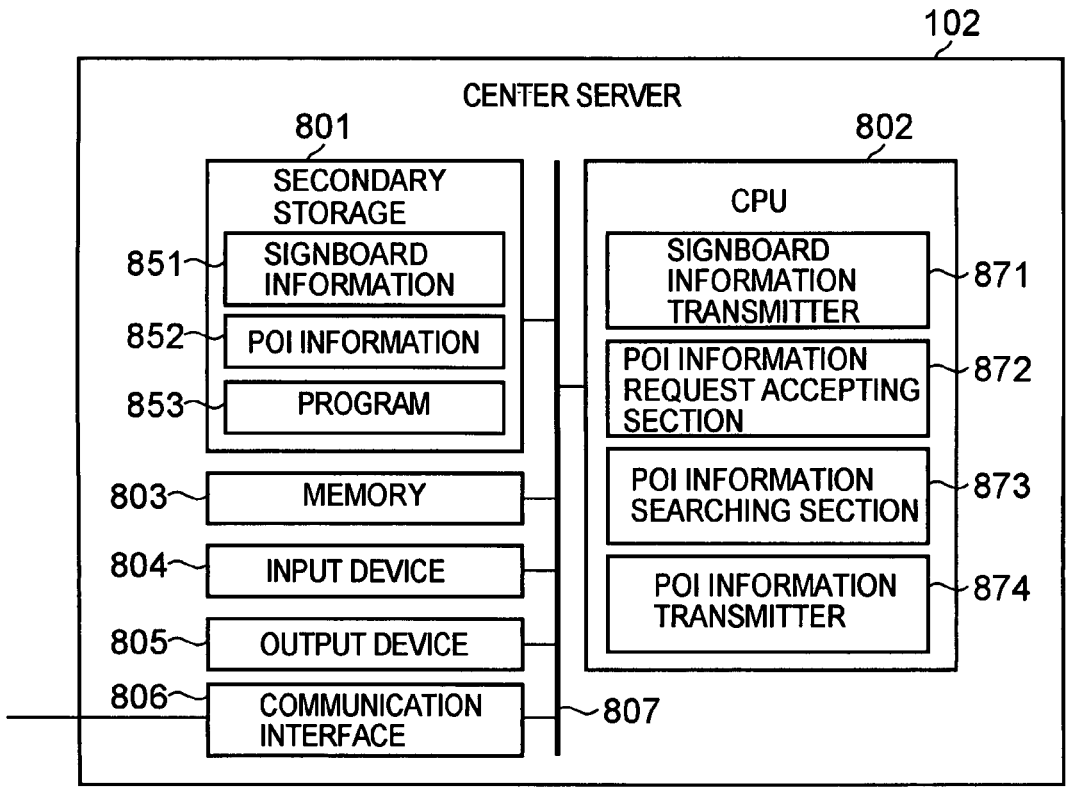
FIG. 8 illustrates a configuration example of a center server in the embodiment of the present invention.
FIG. 9 illustrates an example of POI information in the embodiment of the present invention.

In FIG. 9, the POI information 852 and the POI information 255 include an ID 901, a signboard position 902, a character string 903, a location 904, detailed information 905, and the like. The ID 901, the signboard position 902, the character string 903, the location 904, the detailed information 905, and the like, registered in each line, are associated with one another. The ID 901 is identification information for a signboard. The signboard position 902 is a position where the signboard associated with the ID 901 exists. The character string 903 represents a name of a service or a retail-store indicated by a character described on the signboard associated with the ID 901, and a logo, a trademark, or the like, described on the signboard associated with the ID 901. The location 904 is a place where the service is available or the retail-store is located, being indicated by the logo, the trademark, or the like, described on the signboard associated with the ID 901. The detailed information 905 include detailed information regarding the service and the retail-store indicated by the logo, the trademark, or the like described on the signboard associated with the ID 901.

In addition, as shown in the example of FIG. 9, the signboard position 902 does not necessarily match the location 904, even though they are associated with each other. This is because the signboard may indicate information such as "Gas station, 5 km ahead", for instance. In this case, the signboard position 902 indicates a position where the signboard is installed, and the location 904 indicates a location of the gas station.

Next, an operation example will be explained.

Firstly, with reference to FIG. 10, an overview of the present embodiment will be explained according to a sequence operation example.

An explanation will be made regarding the example shown in FIG. 10, where a user firstly sets a destination via speech input, and the in-vehicle apparatus 101 guides the user to the destination set. However, the example is not limited to the above situation, and setting of the destination or the like may be omitted.

Figure 10:
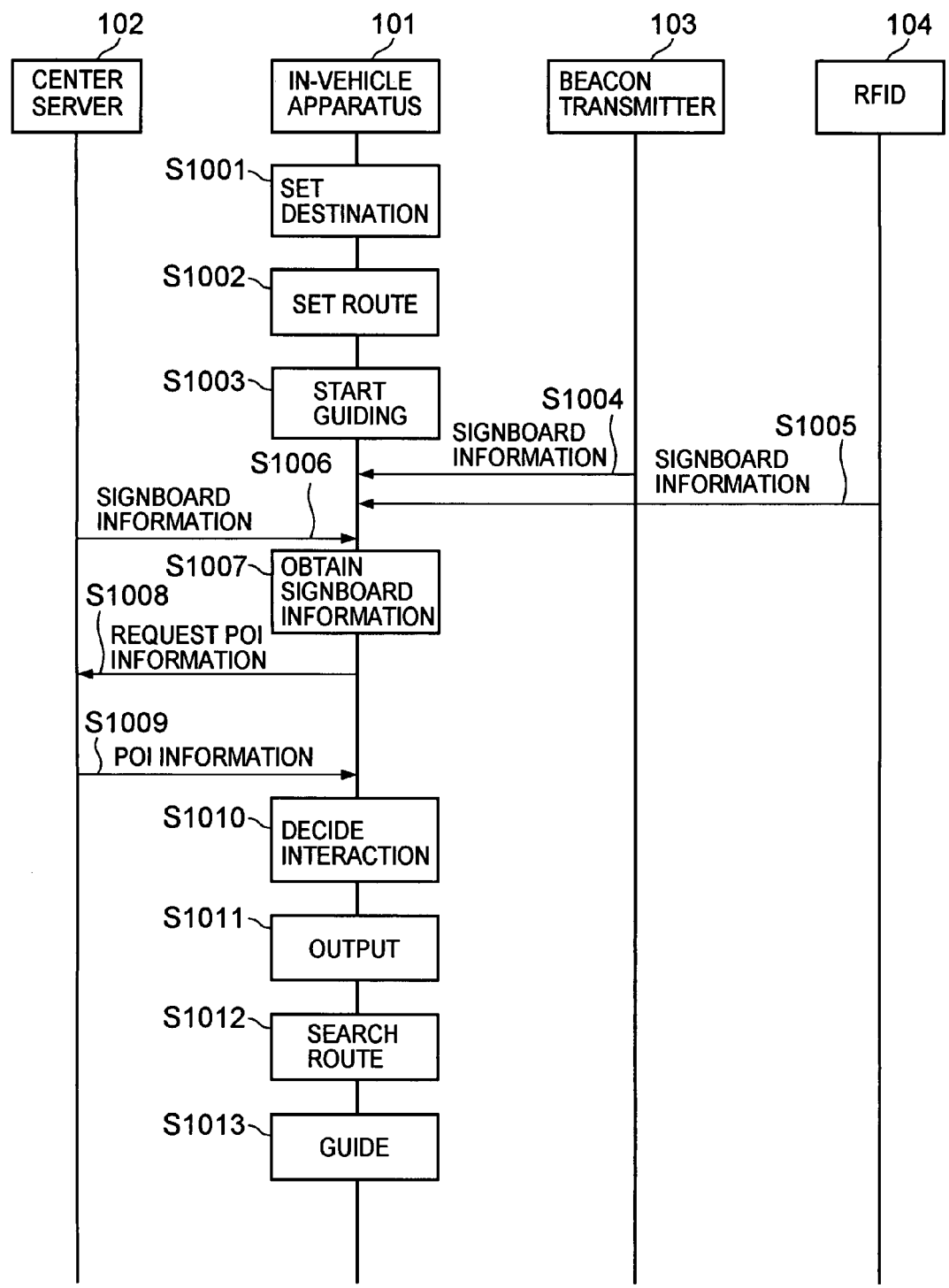
FIG. 10 illustrates a sequence example of the embodiment of the present invention.

In FIG. 10, the user inputs a destination by an utterance. Specifically, by way of example, the navigation processor 282 of the in-vehicle apparatus 101 outputs, from the speaker, synthesized speech saying "Destination, please". In response to this, the user says "XX amusement park". This speech information (analog) is inputted by the microphone 207 of the in-vehicle apparatus 101. The speech information inputted is subjected to a conversion process or the like by an AD converter (not illustrated), to be converted into speech data (digital data). The speech accepting section 277 of the in-vehicle apparatus 101 accepts the speech data. The speech recognition processor 278 processes the speech data accepted and converts the speech data into character data (text data). These processes are based on a technique that is the same as in conventional speech recognition technology.

The navigation processor 282 makes a search for a route to the destination inputted via speech, by the use of the Dijkstra method or the like, for instance. In addition, the navigation processor 282 sets one of the searched routes as a recommended route (S1002). The navigational processor 282 outputs image data and synthesized speech data from the speaker 208, the display 209, and the like, to guide the user to the recommended route set (S1003). This route searching, route guiding and the like, are the same as in technology of conventional navigation systems.

As described above, the beacon transmitter 103 or the like is installed in the vicinity of the road. In addition, the RFID 104 or the like is installed at a location such as in a retail-store or on a signboard.

Upon accepting a signal from the beacon transmitter 103, the signboard information acquiring section 271 of the in-vehicle apparatus 101 transmits a signboard information request. The beacon transmitter 103 transmits the information including a signboard information item, in response to the request (S1004). This information may include traffic congestion information or the like, similar to conventional technology. The signboard information acquiring section 271 of the in-vehicle apparatus 101 extracts a signboard information item from the information received, and stores the information item in the signboard information 253.

Furthermore, the signboard information acquiring section 271 of the in-vehicle apparatus 101 reads a signboard information item held by the RFID 104 at a predetermined location or the like (S1005). The signboard information acquiring section 271 stores the obtained signboard information item in the signboard information 253.

In addition, the signboard information acquiring section 271 of the in-vehicle apparatus 101 transmits a signboard information request to the center server 102, once every predetermined time period, at a predetermined place, or the like. The signboard information transmitter 871 of the center server 102 transmits, to the in-vehicle apparatus 101, the signboard information item read from the signboard information 851 (S1006). The signboard information acquiring section 271 stores the received signboard information item in the signboard information 253.

The image capturing section 272 of the in-vehicle apparatus 101 captures an image taken by the camera 211 once every predetermined time period, at a predetermined place, or the like. The image processor 273 processes the captured image and obtains the signboard information (S1007). Specifically, by way of example, the image processor 273 obtains signboard information items of signboards in the surroundings, according to the information of logo, trademark, or the like, within the recognition image information 252 and a result of image processing to which the image captured by the image capturing section 272 has been subjected. The image processor 273 subjects the image captured by the image capturing section 272 to image processing to acquire a character string, and obtains the signboard information items of signboards in the surroundings. The image processor 273 stores the obtained signboard information items in the image-derived signboard information 254.

The identification section 274 compares the image-derived signboard information 254 with the signboard information 253, and obtains a signboard information item indicating an identical signboard.

The POI information acquiring section 275 of the in-vehicle apparatus 101 requests a POI information item from the center server 102 (S1008). The POI information request accepting section 872 of the center server 102 accepts the POI information request. The POI information searching section 873 of the center server 102 makes a search for a POI information item requested from the secondary storage 801. The POI information transmitter 874 reads the retrieved POI information item, and transmits the POI information item to the in-vehicle apparatus 101 (S1009). The POI information acquiring section 275 of the in-vehicle apparatus 101 stores the received information item in the POI information 255.

Here, when the user utters something, this speech information is inputted by the microphone 207 of the in-vehicle apparatus 101. The speech information inputted is converted to speech data via the AD converter, or the like. The speech accepting section 277 of the in-vehicle apparatus 101 accepts the speech data. The speech recognition processor 278 converts the speech data accepted by the speech accepting section 277 into a character string (text data). The determining section 279 determines whether or not the character string converted by the speech recognition processor 278 includes a noun substitute within the noun substitute information 256, and whether or not the character string includes information regarding each signboard either in the signboard information 253 or in the image-derived signboard information 254. The dialogue processor 280 decides a response according to the result of the determination in the determining section 279 (S1010). The output processor 281 outputs the response according to the decision of the dialogue processor 280 (S1011). After the user's intention is determined according to the interaction as described above, the navigation processor 282 performs processing in accordance with the intention. In the example here, the navigation processor 282 makes a search for a route, setting a position indicated by the signboard that is specified by the user utterance as a new destination or routing (S1012), and starts guiding the user to the recommended route that has been set (S1013).

Specifically, by way of example, a situation will be explained where the user says, "How to I get to the restaurant shown that?" On this occasion, the determining section 279 determines that this restaurant is the one described on the signboard, according to the information items in the noun substitute information 256, in the signboard information 253, and in the image-derived signboard information 254. According to this determination result, the dialogue processor 280 decides a response, for example, "Do you mean the restaurant that was shown on the signboard just now?" The output processor 281 outputs the decided response to the speaker 208 and the display 209. If the intention of the user who hears this response is to go to the restaurant described on the signboard, the navigation processor 282 outputs the information regarding the restaurant, and performs a route search, guidance, and the like.

Next, each of the operations described above will be explained in detail.

In the present embodiment, it is assumed that the navigation processor of the in-vehicle apparatus 101 calculates a current position of the vehicle 106 every predetermined period of time or every predetermined traveled distance, and the current position is stored in the memory 203 or the like. The operation example to calculate the current position by the navigation processor 282 is the same as in conventional navigation systems. In other words, for example, the navigation processor 282 calculates a position that minimizes the cost, based on a traveled distance and a direction from a position as a base point, and road data within the map information 251, and the calculated position is set as the current position of the vehicle 106. For example, the navigation processor 282 may calculate current position of the vehicle 106, according to a signal or the like, received from the GPS receiver 210.

Firstly, operation examples will be explained in which the in-vehicle apparatus 101 obtains a signboard information item, from the beacon transmitter 103, the RFID 104, and the center server 102. Since these operation examples are identical except for details, all the examples will be explained with reference to FIG. 11.

An explanation will be made regarding the operation example in which a signboard information item is received from the beacon receiver 103.

The beacon transmitter 103 is installed in proximity to the road. This beacon transmitter 103 is connected to a center information processor (not illustrated), or the center server 102, and obtains a signboard information item. The beacon transmitter 103 issues a signboard information item. This signboard information item includes an ID of each signboard, a position where each signboard is installed, a character string shown on each signboard, and the like.

The vehicle 106 drives on a road on which the beacon transmitter 103 is installed, and when communication becomes available between the in-vehicle apparatus 101 and the beacon transmitter 103, the signboard information acquiring section 271 of the in-vehicle apparatus 101 obtains an ID of each signboard, a position where each signboard is installed, a character string shown on each signboard, and the like, which are issued from the beacon transmitter 103 (S1101). The signboard information acquiring section 271 stores the ID of each signboard, the position where each signboard is installed, the character string shown on each signboard, and the like, respectively in the corresponding ID

401, the signboard position 402, the character string 403, and the like, of the signboard information 253 in the secondary storage 201 (S1102).

Next, an operation example will be explained, in which the in-vehicle apparatus 101 reads a signboard information item from the RFID 104.

The RFID 104 stores a signboard information item in the storage (not illustrated). The signboard information item includes an ID of each signboard, a position where each signboard is installed, a character string shown on each signboard, and the like.

When the vehicle 106 arrives at a position where the information is readable from the RFID 104, the signboard information acquiring section 271 of the in-vehicle apparatus 101 receives, from the RFID 104, an ID of each signboard, a position where each signboard is installed, a character string shown on each signboard, and the like, via the communication device 206, such as an RFID reader and writer (S1101). The signboard information acquiring section 271 stores the ID of each signboard, the position where each signboard is installed, the character string shown on each signboard, and the like, respectively in the corresponding ID 401, the signboard position 402, the character string 403, and the like, of the signboard information 253 in the secondary storage 201 (S1102).

Next, an operation example will be explained, in which the in-vehicle apparatus 101 obtains a signboard information item from the center server 102.

The signboard information acquiring section 271 transmits a signboard information request to the center server 102. In response to the request, the signboard information transmitter 871 of the center server 102 reads a signboard information item from the signboard information 851, and transmits the read information item to the apparatus 101. Specifically, by way of example, the signboard information transmitter 871 transmits an ID of each signboard, a position where each signboard is installed, a character string shown on each signboard, and the like.

Here, the signboard information requested to the center server 102 may indicate a signboard that is often modified, such as a signboard notifying an event held only in a particular period of time. In addition, the signboard information acquiring section 271 may transmit the signboard information request including therein a current position of the vehicle 106. On this occasion, the signboard information transmitter 871 may transmit only the signboard information item of the signboard that is installed within a predetermined range including the current position that is contained in the signboard information request.

The signboard information acquiring section 271 receives an ID of each signboard, a position where each signboard is installed, a character string shown on each signboard, and the like (S101). The signboard information acquiring section 271 stores the ID of each signboard, the position where each signboard is installed, the character string shown on each signboard, and the like, respectively in the corresponding ID 401, the signboard position 402, the character string 403, and the like, of the signboard information 253 in the secondary storage 201 (S1102).

Figure 11:
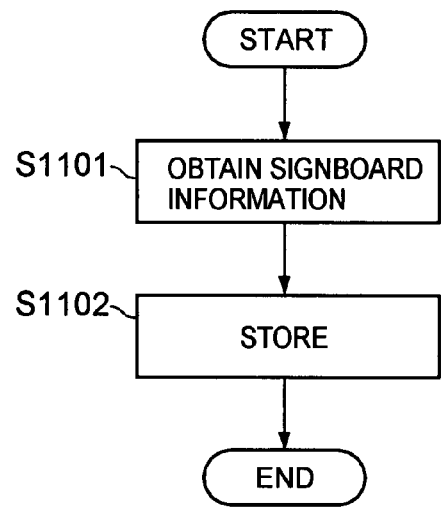
FIG. 11 illustrates an operation example to obtain the signboard information in the embodiment of the present invention.

It is to be noted that the in-vehicle apparatus 101 may start the operations as shown in FIG. 11 at any timing. Specifically, by way of example, the in-vehicle apparatus 101 stores, in advance, in the secondary storage 201, an area in which communication is possible with the center server 102, the beacon transmitter 103, the RFID 104, and the like. The operation example as shown in FIG. 11 may be started when the current position of the vehicle 106 enters this area. In addition, the in-vehicle apparatus 101 may start the operation example as shown in FIG. 11, upon receipt of a signal issued from the beacon transmitter 103. Alternatively, the operation example as shown in FIG. 11 may be started according to a directive from the user.

Next, an operation example for the in-vehicle apparatus 101 to capture an image will be explained.

Figure 12:
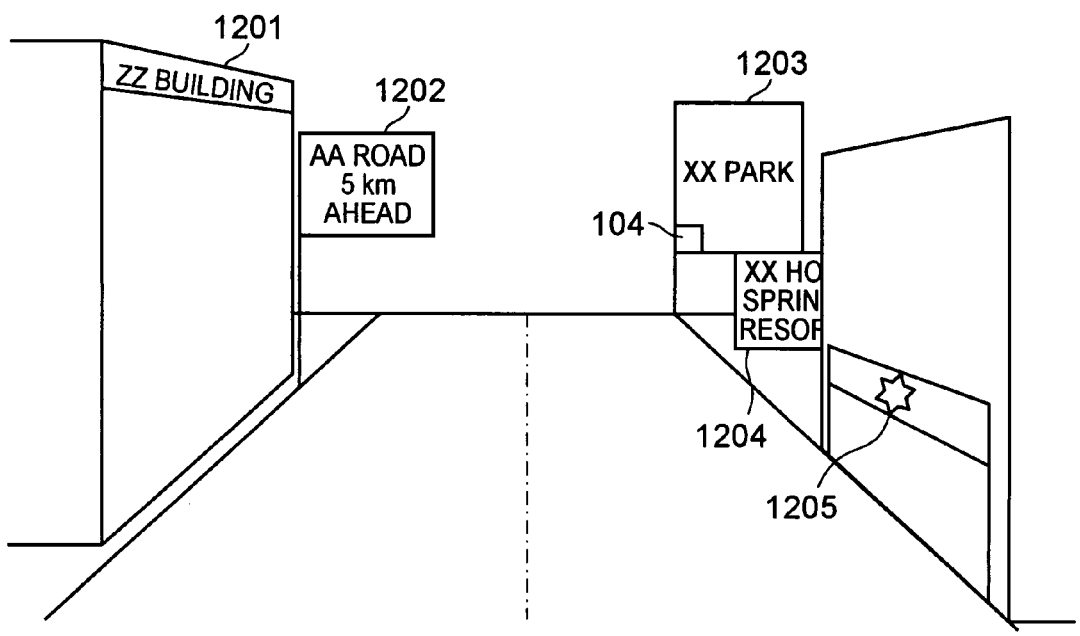
FIG. 12 illustrates an example of an image that is taken in the embodiment of the present invention.

With reference to FIG. 12, an example of road circumstances of which the in-vehicle apparatus 101 takes an image will be explained.

FIG. 12 illustrates an example of an image that the camera 211 of the in-vehicle apparatus 101 has taken, while the vehicle 106 is driving on a road. In FIG. 12, signboards 1201 to 1205, and the like, are visible from the vehicle 106 driving on the road. In the example of FIG. 12, the RFID 104 is installed on the signboard 1203. The in-vehicle apparatus 101 executes the operation for the RFID 104 as described in the above example, thereby obtaining signboard information.

The in-vehicle apparatus 101 executes an operation for this image data, an example of the operation shown in FIG. 13 as described below.

Figure 13:
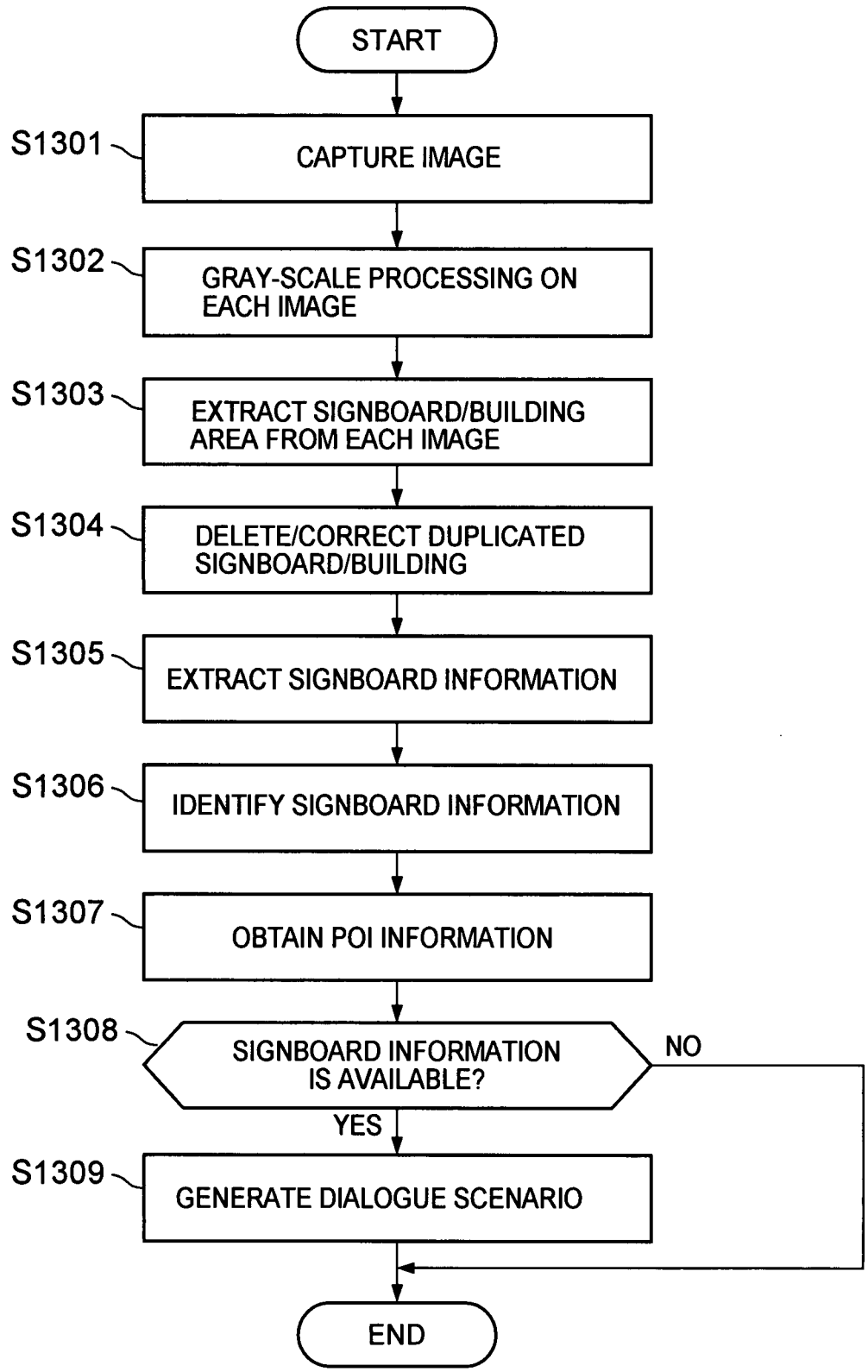
FIG. 13 illustrates an operation example to obtain the signboard information in the embodiment of the present invention.

In FIG. 13, the image capturing section 272 captures an image taken every 100 milliseconds, for example, from the camera 211 (S1301). Here, the image capturing section 272 acquires multiple images sequentially taken every 100 milliseconds, for example. On this occasion, the image capturing section may control shooting direction, a zoom, or the like, of the camera 211, according to line-of-sight information of the user. This line-of-sight information can be obtained by a conventional technology such as an eyemark recorder. The image capturing section 272 determines which area within the image is focused on by the user, according to the line-of-sight information, and the image capturing section may exercise control, so that the camera 211 is directed to the area and made to zoom therein. The image capturing section 272 stores the acquired image, line-of-sight information of the image, frame time, and the like, in the secondary storage 201, in the memory 203, or the like.

The image capturing section 272 subjects each inputted image to gray-scale processing such as multilevel data processing (S1302). This process is the same as the process used for conventional image processing. Next, the image capturing section 272 specifies an area where a photographic object such as a signboard and a building is shown, with respect to each image (S1303). In order to specify this area, by way of example, the image capturing section 272 performs segmentation of the area showing the same photographic object such as the signboard and the building in each image, by subjecting each image to conventional technology such as edge detection, texture analysis, and the like. Hereinafter, this area will be referred to as "processing target area". The image data of each processing target area that is specified in each image is stored in the secondary storage 201, in the memory 203, or the like, by the image capturing section 272.

Next, the image capturing section 272 determines whether or not there is a duplication among each processing target area specified by the process in S1303, with respect to an image captured at the n-th order (n is an integer, greater than or equal to 1), and each processing target area specified by the process in S1303, and with respect to an image captured at the (n+1)-th order, among multiple images sequentially captured. As a result of the determination, if there is any duplication, the redundant processing target area is subjected to deletion or correction (S1304). Here, "deletion of the processing target area" indicates that the processing target area is excluded from an object of a signboard information extracting process, which will be described below. Specific processing for the deletion is not particularly limited. However, the image capturing section 272 firstly acquires a difference picture between the image captured at the n-th order and the image captured at the (n+1)-th order. Next, the image capturing section 272 determines that there is duplication in the processing target area, based on whether or not the difference picture includes a pixel having a predetermined threshold or less, in proximity to each processing target area that has been specified in the above process in S1303, with respect to the image captured at the n-th order. On this occasion, the image capturing section 272 determines whether the processing target area is to be deleted or corrected, according to the number of pixels that the difference picture includes in proximity to each processing target area that has been specified in the above process in S1303, with respect to the image captured at the n-th order. Specifically, by way of example, the image capturing section 272 may delete the processing target area, when the number of pixels that the difference picture includes, in proximity to each processing target area that has been specified in the above process in S1303, with respect to the image captured at the n-th order, is equal to or less than a first threshold. In addition, by way of example, the image capturing section 272 may correct the processing target area of the image captured at the n-th order, by the same processing target area of the image captured at (n+1)-th order, when the number of pixels that the difference picture includes in proximity to each processing target area that has been specified in the above process in S1303, with respect to the image captured at the n-th order, is larger than the first threshold and less than a second threshold. These first threshold and second threshold may be any optional values.

The image capturing section 272 further deletes, from the secondary storage 201 or the memory 203, the image data of the processing target area that was deleted according to the above determination, assuming that it is excluded from the object of the image processing described below. The image capturing section 272 corrects the processing target area that was determined as a correction object by the determination above. Specifically, by way of example, the processing target area of the image captured at n-th order is combined with the processing target area of the image captured at (n+1)-th order, and those combined areas are stored in the secondary storage 201, the memory 203, or the like. This combining process is not particularly limited, and may be the same as in conventional image processing techniques. By way of example, it is preferable that the image processor 273 uses a part of either one of the processing target areas as a reference to extract a matching part by a pattern-matching process, and a correction is made, such as superimposing the matching part on another.

The image capturing section 272 subjects all the images captured in S1301 to the processing above. Here, it can be considered that at least three images are captured in S1301 and processing target areas that are duplicated are included in at least the three images in the aforementioned S1304. In this situation, the image capturing section 272 selects only one processing target area out of the duplicating processing target areas, and subjects the selected area to the signboard information extracting process described below. Any selection criterion may be applicable here, and it is possible to assume that a processing target area extracted from an image, which was taken initially or lastly, is the processing target, for example. Alternatively, a processing target area extracted from an image taken around the middle point may be assumed to be the processing target.

Next, the image processor 273 subjects the image data of each processing target area that was extracted, corrected, or the like, in the aforementioned steps S1303 and S1304, to image processing, and obtains signboard information (S1305). Specifically, the image processor 273 extracts a character string, a trademark, a logo, or the like, from the image data of each processing target area. In order to extract a character string from the image, the image processor 273 may employ a conventional technique such as OCR (Optical Character Reader). The image processor 273 firstly reads an image 302 of each line, from the recognition image information 252, for example, in order to extract the trademark, the logo, or the like, from the image. Next, the image processor 273 uses each image 302 read, as a reference, and selects an image 302 matching the pixel pattern of the image data in the processing target area, by a conventional pattern matching technique. Then, the image processor 273 reads out a character string 303 associated with the image 302 selected, from the recognition image information 252. The image processor 273 stores the character string that was extracted, in the image-derived signboard information 254. Specifically, for example, the image processor 273 issues an ID corresponding to the processing target area subjected to the processing above, and stores current position of the vehicle 106, the issued ID, and the character string extracted in the above processing, respectively as the image-taking position 501, the ID 502, the character string 503, and the like, in such a manner that those elements are associated with one another.

The identification section 274 compares the signboard information extracted from the image data, with the signboard information obtained from the center server 102, beacon transmitter 103, RFID 104, and the like, and the signboard information previously stored. If there are identical information items, they are associated with each other (S1306). For performing the processing above, for instance, the identification section 274 extracts lines having the image-taking position 501 and the signboard position 402, which are within a predetermined range, respectively from the image-derived signboard information 254 and the signboard information 253. Next, the identification section 274 determines whether the character string 503 and the character string 403 that was extracted are identical. They may be determined to be identical when all the characters match, or at least a predetermined number of the characters match. When they are determined to be identical as a result of the determination, the identification section 274 decides that the lines that were extracted indicate the signboard information of an identical signboard, and association is established therebetween. Specifically, the identification section 274 reads the ID 401 of the line extracted from the signboard information 253, and stores the ID 401 as the second ID 504 of the image-derived signboard information 254.

Next, the POI information acquiring section 275 obtains a POI information item from the center server 102 (S1307). In order to obtain the POI information item, the POI information acquiring section 275 transmits a POI information request to the center server 102. On this occasion, the POI information acquiring section 275 may include a current position, a traveling azimuth, and the like, of the vehicle 106 in the request.

The center server 102 receives the POI information request. The POI information request accepting section 872 accepts the POI information request. The POI information searching section 873 searches the POI information 852 for a POI information item to be transmitted, according to the current position, traveling azimuth, and the like. Specifically, by way of example, the POI information searching section 873 refers to the signboard position 902 of each line of the POI information 852, and selects a line having the signboard position within a predetermined range in the longitudinal direction with respect to the traveling azimuth centering on the current position, the traveling azimuth and the current position that was contained in the POI information request. Next, the POI information searching section 873 reads the ID 901, the signboard position 902, the character string 903, the location 904, the detailed information 905, and the like, of the selected line. The POI information searching section 873 transmits the retrieved POI information item to the in-vehicle apparatus 101.

The POI information acquiring section 275 of the in-vehicle apparatus 101 stores the received POI information item in the POI information 255.

The dialogue scenario generator 276 determines whether or not at least one of the signboard information items that was extracted in S1305 is available (S1308). For this determination, the dialogue scenario generator 276 selects a line that has an ID in the second ID 504, from the image-derived signboard information 254, and reads the image-taking position 501 and the character string 503 of the selected line. Next, the dialogue scenario generator 276 refers to each line of the POI information 255, and determines whether or not the line includes the signboard position 902 within a predetermined range from the readout image-taking position 501, and the character string 903 matching the readout character string 503. As a result of the determination, if such information is included, the dialogue scenario generator 276 determines that the signboard information item of this line is available.

As a result of the determination in S1308, if none of the signboard information is available, it is considered that all the signboard information items extracted from the taken image are erroneously recognized, for instance. Therefore, the dialogue scenario generator 276 stores "-" in the dialogue scenario 505, associated with the image-taking position 501, the ID 502, the character string 503, and the second ID 504 of the image-derived signboard information 254, which are stored in the above processing, thereby indicating that there is no dialogue scenario, and the processing is terminated.

If the signboard information is available as a result of the determination in S1308, the dialogue scenario generator 276 generates a response scenario based on the POI information item, a predetermined format, and the like (S1309). Specifically, for instance, a response format is fixed in advance, and the character string of the signboard information determined as available in S1308 above is set as a candidate for variables within this response format. The dialogue scenario generator 276 stores the generated dialogue scenario in the dialogue scenario 505 of the line that is determined as available in S1308 above, in the image-derived signboard information 254.

This dialogue scenario may be optionally defined, but in the example here, a response to the user's utterance is prepared for the purpose of confirming that the signboard is the one which the user intended, and when the signboard is confirmed, a process responding to the user's request is carried out. Specifically, by way of example, in response to the user's utterance, a response format for confirmation, such as "Do you mean <variable> that was shown on the signboard just now?" is prepared. Here, "<variable>" is a character string of the signboard information that is determined as available in the processing in S1308 above. In the example of FIG. 5, "AA road 5 Km ahead", "YY convenience store", "XX hot-spring resort", and the like, may be set as candidates for the "<variable>". Once the signboard is confirmed by the response above, the dialogue scenario of the present embodiment then performs a process that is specified by the user's utterance before and after the confirmation.

Figure 14:
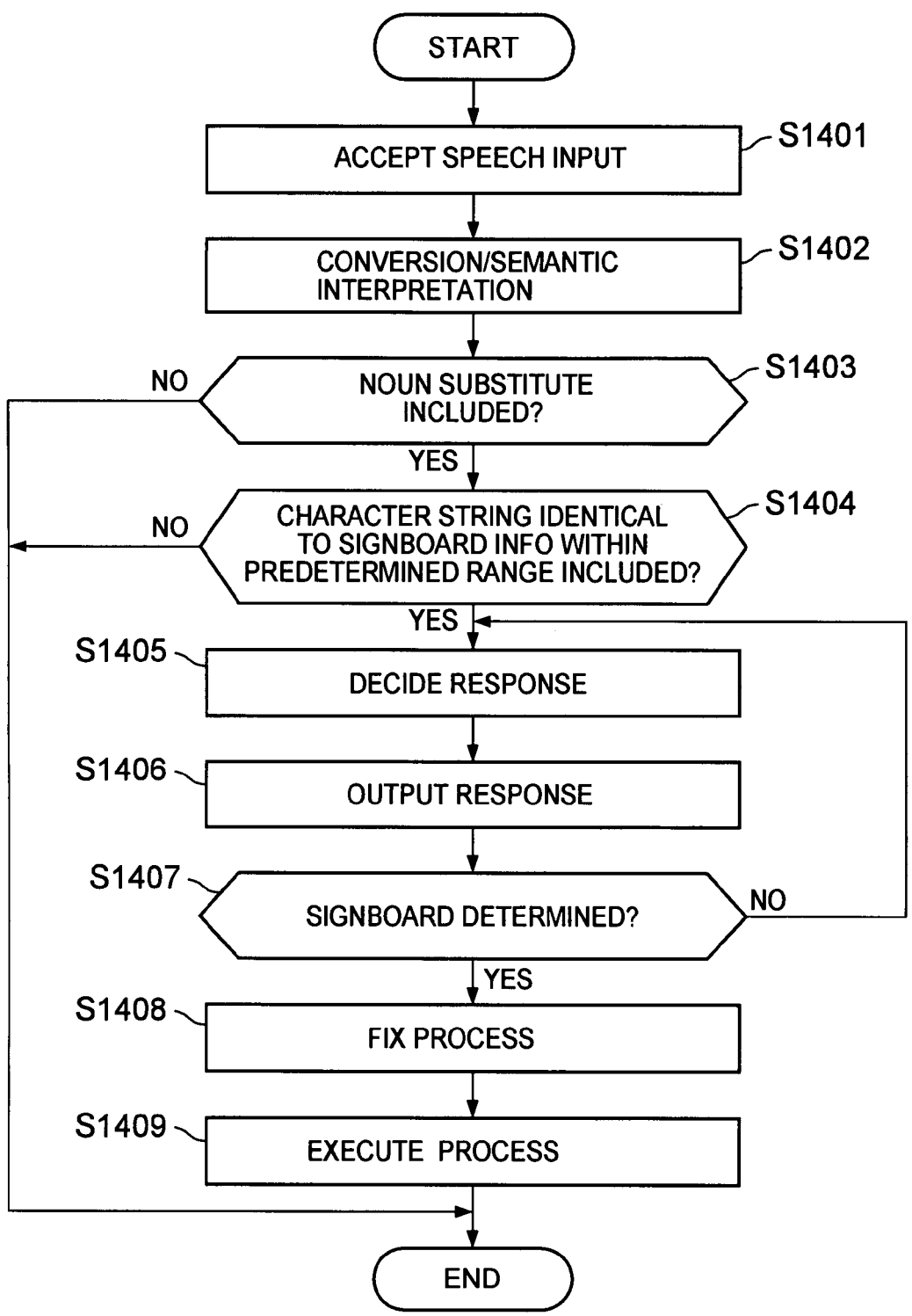
FIG. 14 illustrates an operation example that specifies a signboard intended by the user and then executes processing in the embodiment of the present invention.

Next, an operation example to interact with the user will be explained with reference to FIG. 14.

The speech accepting section 277 of the in-vehicle apparatus 101 accepts speech data inputted from the microphone 207 (S1401). The speech recognition processor 278 converts the inputted speech data into text data. This conversion process is the same as a conventional speech recognition technique. For instance, the speech is analyzed to extract an acoustic feature parameter, and the text data is obtained based on this acoustic parameter, and, for example, a HMM (Hidden Markov Model), a statistical language model, and the like. The speech recognition processor 278 performs SISR (Semantic Interpretation for Speech Recognition), or the like, based on an element such as the dictionary 257 (S1402).

The determining section 279 determines whether the text data that was converted includes a noun substitute in the noun substitute information 256 (S1403).

As a result of the determination in S1403, if the noun substitute is included, the determining section 279 determines whether or not the text data that was converted includes a character string that is shown on the signboard within a predetermined range from the current position, and the character string is available according to the process in S1308 (S1404). Specifically, by way of example, the determining section 279 selects from the image-derived signboard information 254, a line having the image-taking position 501 within a predetermined range from the current position of the vehicle 106. This predetermined range may be optionally defined. For instance, the predetermined range may be fixed in advance. Alternatively, the range may be varied in accordance with the speed of the vehicle 106, for example, the range is made wider as the speed of the vehicle becomes higher. Next, the determining section 279 determines whether or not the character string 503 of the selected line includes a character that matches the text data that was converted. This determination may be made, for example, whether or not there is a match between the character string 503 in the selected line and the characters within the text data that was converted, with respect to at least a predetermined number of the characters. Next, the determining section 279 determines whether or not the second ID 504 of the selected line is "-". As a result of the determination, if the second ID 504 of the selected line is not "-", the determining section 279 determines that the text data that was converted includes a character string shown on the signboard within a predetermined range from the current position, and the character string is determined to be available, by the processing in S1308 above.

As a result of the determination in S1403, if no noun substitute is included, or as a result of the determination in S1404, the text data that was converted does not include the character string shown on the signboard information determined as available by the processing in S1308 above, the determining section 279 terminates the processing. On this occasion, the output processor 281 may output, from the speaker 208, the display 209, or the like, information notifying that a response is not possible.

As a result of the determination in S1404, if the text data that was converted includes a character string of the signboard information determined to be available in the processing in S1308 above, the determining section 279 directs the dialogue processor 280 to execute a signboard interactive response process. The dialogue processor 280 decides a response according to an dialogue scenario generated in the process of S1309 described above (S1405). In order to decide the response, the dialogue processor 280 reads the dialogue scenario 505 of the line selected from the image-derived signboard information 254 in the process of S1404, and performs an interactive process according to the dialogue scenario read.

The dialogue scenario generated in the present embodiment as described above executes a process specified by the user's utterance, after the signboard intended by the user is confirmed. Therefore, if the process in S1405 is performed for the first time, the process decided here is to make a response for confirming the signboard intended by the user. As described above, in the dialogue scenario, the response format is fixed, and as a variable included in the response format, the character string of the signboard information is set. The dialogue processor 280 decides a response by setting as the variable, a character string of the signboard information that was determined as available in the process of S1308 above.

The output processor 281 outputs, from the speaker 208, the display 209, or the like, a response decided by the dialogue processor 280 (S1406).

The user hears the response confirming the signboard, and says whether or not the signboard is the one the user himself or herself intended. This speech is inputted from the microphone 207 in a similar manner to that described above. The speech recognition processor 278 performs conversion into text data, semantic interpretation, and the like. The user may use the input device 204 instead of speech, for confirming the signboard.

The dialogue processor 280 determines, according to the response that was inputted, whether or not the signboard intended by the user matches the signboard concerning which the confirmation response was outputted in the process of S1406 (S1407).

As a result of the determination in S1407, if there is no match therebetween, the dialogue processor 280 performs the process of S1405 again. In other words, the dialogue processor 280 sets, as the variable of the response format, a character string of other signboard information that is determined to be available by the process of S1308. It is noted here, if signboard information is not available, the dialogue processor 280 may output information indicating such unavailability, and terminate the processing.

As a result of the determination in S1407, if there is a match therebetween, the dialogue processor 280 fixes a process executable by the in-vehicle apparatus 101 (S1408). In order to fix the process, for example, the dialogue processor 280 determines whether the utterance accepted in S1401 or the user's utterance with respect to the response outputted in S1406 includes, for example, a character string indicating an execution of a process that is executable by the in-vehicle apparatus 101, such as route searching, guiding, and outputting of detailed information. It is to be noted that such determination is the same as conventional speech recognition techniques. If the character string indicating such a process execution is included, the dialogue processor 280 executes the pertinent process. On the other hand, if the user's utterance does not include a character string indicating the execution of process that is executable by the in-vehicle apparatus 101, the dialogue processor 280 may output, from the speaker 208 and/or the display 209, information requesting an input of a process to be executed. The user inputs a process requiring execution, via the input device 204 or the microphone 207. It is assumed that the dialogue processor 280 executes the process that was inputted.

The navigation processor 282 executes the process determined by the dialogue processor 280 (S1409), and then terminates the process.

It is to be noted that the determination in S1403 above is not imperative. If the determination in S1403 is not made, the processing from S1405 above may be performed under the condition that it is possible to determine in S1404 that the user's utterance relates to the information shown on the signboard. In other words, if the utterance includes a character string which is shown on the signboard that is closest to the place where the utterance was accepted, and which is determined as available in the process of S1308 above, the process from S1405 above may be performed.

For example, an information item including text data indicating "something shown that" is previously stored in the secondary storage 201, and if the utterance matches any of the text data within the information item, the process from S1405 above may be performed.

An operation example shown in FIG. 14 will be explained specifically. Here, an explanation will be made regarding a case where the secondary storage 201 stores information shown in FIG. 3 to FIG. 6 as an example, and an utterance "How to get to the hot-spring resort shown that?" is accepted in the processing in S1401 above.

The speech recognition processor 278 carries out the speech recognition process according to an operation example that is the same as conventional techniques. The determining section 279 determines whether or not the utterance "How do I get to the hot-spring resort shown that?" includes a noun substitute within the noun substitute information 256. The example of the noun substitute information 256 as shown in FIG. 6 includes the noun substitute "that". Next, the determining section 279 selects, from the image-derived signboard information 254, a line having the image-taking position 501 within a predetermined range from the current position of the vehicle 106. Here, it is assumed that appropriate lines in the image-derived signboard information 254, shown in FIG. 5 as an example, are ID 501 "XYZ-0001" to "XYZ-0005". Next, the determining section 279 extracts from the lines selected above, a line having the character string 503 including a character matching the text data that was converted, and the second ID 504 is not "-". In the example of FIG. 5, an appropriate line is the line having ID 501 "XYZ-0005", the character string 503 "XX hot-spring resort", and the second ID 504 "1113".

The dialogue processor 280 decides a response according to the dialogue scenario generated in the process of S1309 above. In this example here, it is assumed that a response format "Do you mean <variable> that was shown on the signboard just that?" is prepared. As shown in the process above, since the variable applicable to the <variable> is "XX hot-spring resort", the dialogue processor 280 decides a response that applies the "XX hot-spring resort" to the <variable>. The output processor 281 outputs, from the speaker 208, the display 209, or the like, a response "Do you mean the XX hot-spring resort that was shown on the signboard just now?" is outputted.

The user hears this response as a confirmation of the signboard, and says whether or not it is the signboard that the user himself or herself intended. Here, it is assumed that the user said "Yes". This speech is inputted by the microphone 207 similar to the case above. The speech recognition processor 278 performs the conversion into text data, semantic interpretation, and the like.

The dialogue processor 280 determines whether or not the signboard intended by the user matches the signboard with regard to which the confirmative response was outputted in the process of S1406, according to the response inputted and the dictionary 257. This determination is the same as in conventional speech recognition techniques. In this example here, the user has inputted speech indicating agreement, "Yes". Therefore, the dialogue processor 280 determines that "hot-spring resort" within the inputted speech of "How do I get to the hot-spring resort shown that?" indicates "XX hot-spring" set in the "<variable>".

As described above, since the inputted speech is "How do I get to the hot-spring resort shown that?", the dialogue processor 280 determines that a "route search" for the "XX hot-spring resort" is requested. This determination is the same as in conventional speech recognition techniques. The navigation processor 282 reads the location 904 "X31, Y31" of a line including the "XX hot-spring resort" in the character string 903, from the POI information, and conducts a route search setting the position read as a destination. Here, if the destination is already fixed, searching the route may be conducted, setting the XX hot-spring resort as routing, without changing the destination. This route searching process itself is the same as in the conventional art.

According to the technique of the present embodiment as described above, it is possible to specify a place intended by the user, even with an ambiguous expression, such as "Restaurant shown that".

Second Embodiment

Next, a second embodiment will be explained.

In the second embodiment, it is determined, in response to a noun substitute uttered by the user, whether a user's utterance relates to a signboard, the installed position of which the user has already passed, or to a signboard that the user will subsequently pass.

In the following, a detailed explanations will be omitted constituent elements the same as the first embodiment described above, and a detailed explanation will be made only for elements that are different.

Figure 15:
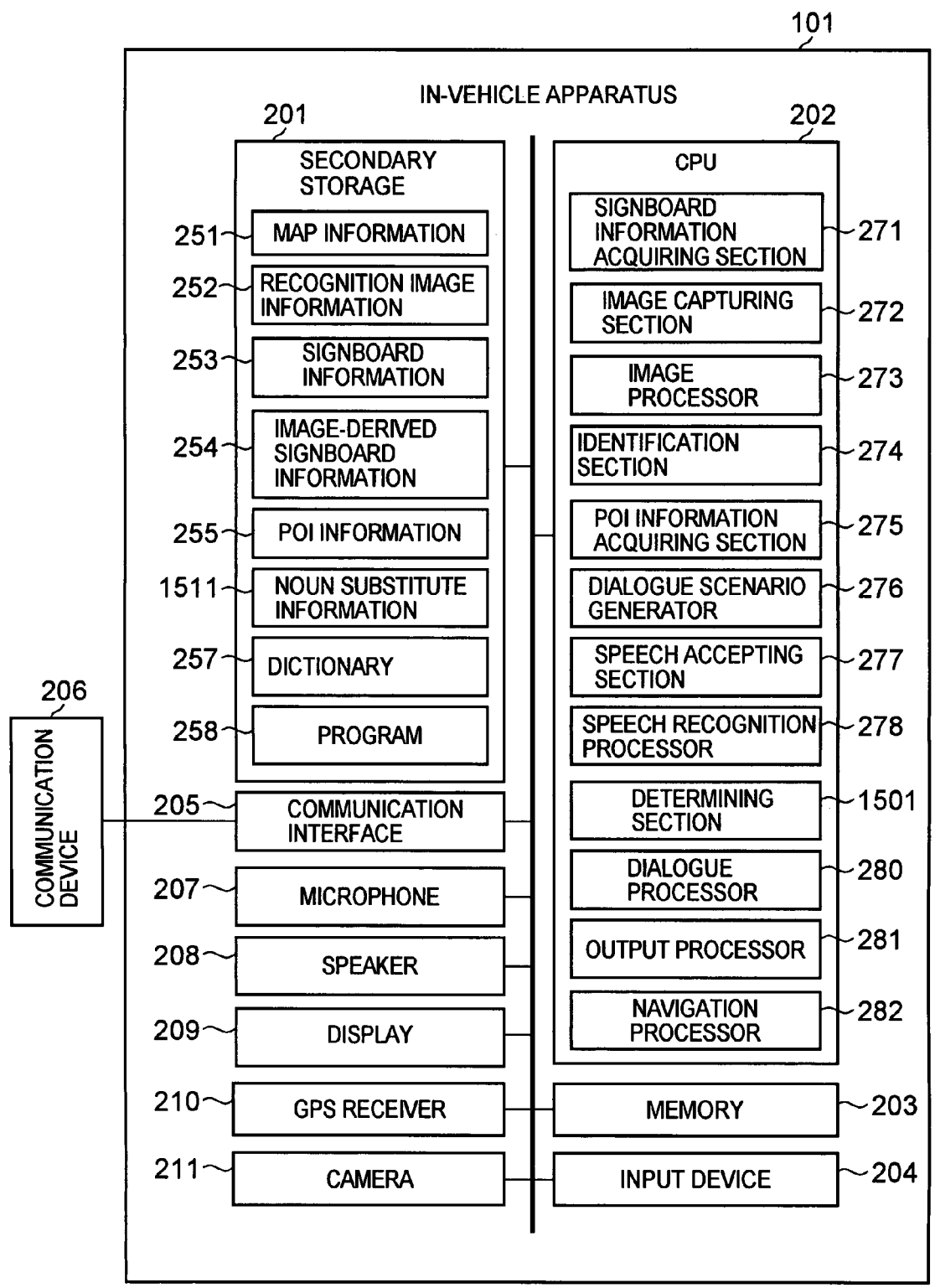
FIG. 15 illustrates a configuration example of the in-vehicle apparatus in a second embodiment of the present invention.

FIG. 15 is a configuration example of the in-vehicle apparatus 101 according to the second embodiment. In FIG. 15, the in-vehicle apparatus 101 includes a determining section 1501, instead of the determining section 279. Further, the in-vehicle apparatus 101 has noun substitute information 1511 instead of the noun substitute information 256.

Here, with reference to FIG. 16, an example of the noun substitute information 1511 will be explained.

In FIG. 16, the noun substitute information 1511 includes a noun substitute 1601, a direction 1602, and the like. The noun substitute 1601, the direction 1602, and the like in each line, are associated with one another. The noun substitute 1601 indicates a noun substitute extracted from speech uttered by a user. The direction 1602 indicates a forward direction or a backward direction, with respect to the traveling direction, in which the signboard is positioned, the signboard being a target of inquiry by the utterance, when the associated noun substitute 1601 is extracted from speech.

In the example of FIG. 16, the direction 1602 "forward/backward" indicates that the signboard being a target of inquiry by the utterance may be located in any of the two directions, forward or backward, with respect to the traveling direction, when the associated noun substitute 1601 is extracted from speech.

It is assumed that the noun substitute information 1511 is stored in advance in the secondary storage 201. However, there is no limitation to this configuration and the noun substitute information may be added, modified, or the like, according to the information inputted via the input device 204, the communication device 206, and the like.

Next, an operation example will be explained. The operation example explained in the following is different from the first embodiment described above, only in the point that according to the noun substitute included in the utterance, it is determined whether the utterance relates to a signboard positioned in the backward direction or the utterance relates to a signboard positioned in the forward direction. Therefore, only this different operation will be explained.

Figure 17:
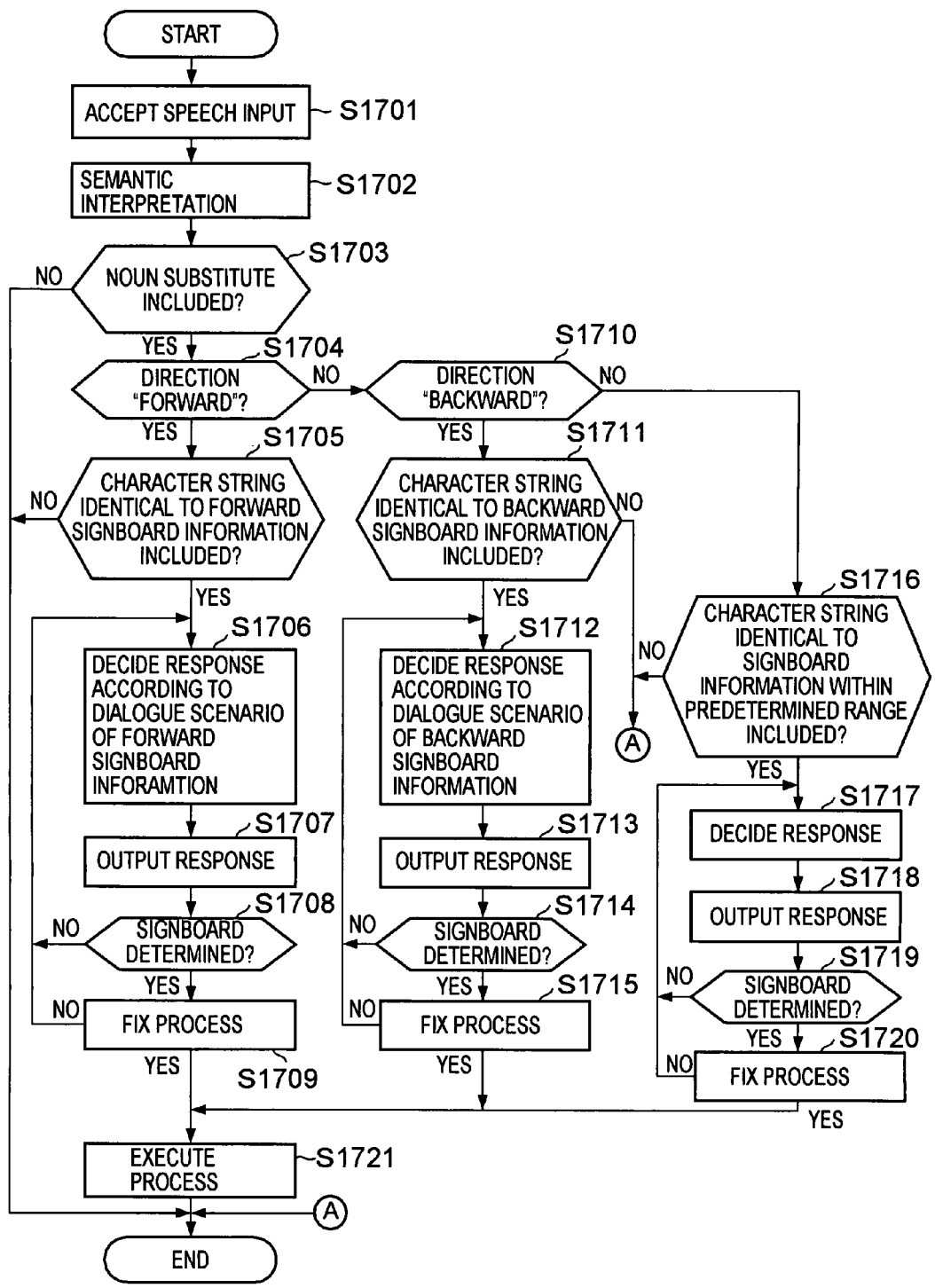
FIG. 17 illustrates an operation example that specifies a signboard intended by the user and then executes processing in the second embodiment of the present invention.

With reference to FIG. 17, an operation example of interaction with a user will be explained.

The speech accepting section 277 of the in-vehicle apparatus 101 accepts speech data inputted from the microphone 207 (S1701). The speech recognition processor 278 converts the speech data into text data. Furthermore, the speech recognition processor performs a process such as semantic interpretation, based on the dictionary 257, and the like (S1702).

The determining section 1501 determines whether or not the text data that was converted includes a noun substitute within the noun substitute information 1511 (S1703). Specifically, the determining section 1501 determines whether or not the noun substitute information 1511 includes a line in which the noun substitute 1601 matches a word included in the text data that was converted.

As a result of the determination in S1703, if the noun substitute is included, the determining section 1501 determines whether the direction of the noun substitute indicates "forward" (S1704). For this determination, the determining section 1501 selects from the noun substitute information 1511, a line in which the noun substitute 1601 matches the word included in the text data that was converted. Furthermore, the determining section 1501 determines whether or not the direction 1602 of the selected line indicates "forward".

As a result of the determination in S1704, if the direction of the noun substitute indicates "forward", the determining section 1501 determines whether or not the text data that was converted includes a character string which is shown on the signboard within a predetermined range forward in the traveling direction from the current position, and which is determined as available in the process of S1308 above (S1705). Specifically, by way of example, the determining section 1501 selects, from the image-derived signboard information 254, a line having the image-taking position 501 within a predetermined range forward in the traveling direction from the current position of the vehicle 106. Next, the determining section 1501 determines whether or not the character string 503 in the selected line includes a character matching the text data that was converted. It is determined that the character string 503 in the selected line includes a character matching the text data that was converted, for example, when there is a match therebetween, as to at least a predetermined number of the characters. Next, the determining section 1501 determines whether or not the second ID 504 of the selected line is "-". As a result of the determination, if the second ID 504 of the selected line is not "-", the determining section 1501 determines that the text data that was converted includes a character string which is shown on the signboard within a predetermined range forward in the traveling direction from the current position, and which is determined as available in the process of S1308 above.

As a result of the determination in S1704, if the text data that was converted includes the character string of the signboard information determined as available in the process of S1308 above, the determining section 1501 directs the dialogue processor 280 to execute the signboard interactive response process. Following the directive above, the dialogue processor 280 determines a response according to an dialogue scenario generated in the process of S1309 above (S1706). Since this process is the same as the first embodiment described above, it will not be explained.

The output processor 281 outputs a response determined by the dialogue processor 280, from the speaker 208, the display 209, or the like (S1707).

The user hears the response confirming the signboard, and says whether or not the signboard is the one intended by the user himself or herself. This speech is inputted by the microphone 207 in a similar manner to that described above. The speech recognition processor 278 performs conversion into text data, semantic interpretation, and the like. Since this processing is the same as the first embodiment, explanations will be omitted.

The dialogue processor 280 determines, according to the response that was inputted, whether there is a match between the signboard intended by the user and the signboard as to which the confirmation response was outputted in S1707 (S1708).

As a result of the determination in S1708, if there is no match therebetween, the dialogue processor 280 performs the process of S1706 again. Since this processing is the same as the first embodiment, explanations will be omitted.

As a result of the determination in S1708, if there is a match therebetween, the dialogue processor 280 fixes the process executable by the in-vehicle apparatus 101 (S1709). Since this processing is the same as the first embodiment, explanations will be omitted.

On the other hand, as a result of the determination in S1704, if the direction of the noun substitute is not "forward", the determining section 1501 determines whether the direction of the noun substitute is "backward" (S1710). For the determination, the determining section 1501 selects, from the noun substitute information 1511, a line having the noun substitute 1601 that matches the word included in the text data that was converted. The determining section 1501 further determines whether or not the direction 1602 in the selected line is "backward".

As a result of the determination in S1710, if the direction of the noun substitute is "backward", the determining section 1501 determines whether or not the text data that was converted includes a character string which is shown on the signboard within a predetermined range backward in the traveling direction from the current position, and which is determined as available in the process of S1308 above (S1711). Specifically, by way of example, the determining section 1501 selects, from the image-derived signboard information 254, a line having the image-taking position 501 within the predetermined range backward in the traveling direction from the current position of the vehicle 106. Next, the determining section 1501 determines whether or not the character string 503 in the selected line includes a character that matches the text data that was converted. It is determined that the character string 503 in the selected line includes a character matching the text data that was converted, for example, when there is a match therebetween, as to at least a predetermined number of the characters. Next, the determining section 1501 determines whether or not the second ID 504 of the selected line is "-". As a result of the determination, if the second ID 504 of the selected line is not "-", the determining section 1501 determines that the text data that was converted includes a character string which is shown on the signboard within a predetermined range backward to the traveling direction from the current position, and which is determined as available in the process of S1308 above.

As a result of the determination in S1711, if the text data that was converted includes the character string of the signboard information determined as available in the process of S1308 above, the determining section 1501 directs the dialogue processor 280 to execute the signboard interactive response process. Following the directive above, the dialogue processor 280 determines a response according to an dialogue scenario generated in the process of S1309 above (S1712). Since this processing is the same as the first embodiment, explanations will be omitted.

The output processor 281 outputs a response determined by the dialogue processor 280, to the speaker 208, the display 209, or the like (S1713).

The user hears the response confirming the signboard, and says whether or not the signboard is the one intended by the user himself or herself. This speech is inputted by the microphone 207 in a similar manner to that described above. The speech recognition processor 278 performs conversion into text data, semantic interpretation, and the like. Since this processing is the same as the first embodiment, explanations will be omitted.

The dialogue processor 280 determines, according to the response inputted, whether there is a match between the signboard intended by the user and the signboard as to which the confirmation response was outputted in S1713 (S1714).

As a result of the determination in S1714, if there is no match therebetween, the dialogue processor 280 performs the process of S1712 again. Since this processing is the same as the first embodiment, explanations will be omitted.

As a result of the determination in S1714, if there is a match therebetween, the dialogue processor 280 fixes the process executable by the in-vehicle apparatus 101 (S1715). Since this processing is the same as the first embodiment, explanations will be omitted.

On the other hand, as a result of the determination in S1710, if the direction of the noun substitute is not "backward", this noun substitute may indicate both "forward" and "backward". Therefore, the determining section 1501 determines whether or not the text data converted includes a character string which is shown on the signboard within a predetermined range from the current position, and which is determined as available in the process of S1308 above (S1716). Specifically, for example, the determining section 1501 selects, from the image-derived signboard information 254, a line having the image-taking position 501 within a predetermined range from the current position of the vehicle 106. Next, the determining section 1501 determines whether or not the character string 503 in the selected line includes a character matching the text data converted. It is determined that the character string 503 in the selected line includes a character matching the text data converted, for example, when there is a match therebetween, as to at least a predetermined number of the characters. Next, the determining section 1501 determines whether or not the second ID 504 of the selected line is "-". As a result of the determination, if the second ID 504 of the selected line is not "-" the determining section 1501 determines that the text data that was converted includes a character string which is shown on the signboard within a predetermined range from the current position, and which is determined as available in the process of S1308 above.

As a result of the determination in S1716, if the text data that was converted includes the character string of the signboard information determined as available in the process of S1308 above, the determining section 1501 directs the dialogue processor 280 to execute the signboard interactive response process. Following the directive above, the dialogue processor 280 determines a response according to an dialogue scenario generated in the process of S1309 above (S1717). Since this processing is the same as the first embodiment, explanations will be omitted.

The output processor 281 outputs a response, determined by the dialogue processor 280, to the speaker 208, the display 209, or the like (S1718).

The user hears the response confirming the signboard, and says whether or not the signboard is the one intended by the user himself or herself. This speech is inputted from the microphone 207 in a similar manner to that described above. The speech recognition processor 278 performs conversion into text data, semantic interpretation, and the like. Since this processing is the same as the first embodiment, explanations will be omitted.

The dialogue processor 280 determines whether there is a match between the signboard intended by the user and the signboard, for which the confirmation response was outputted in S1718 (S1719).

As a result of the determination in S1719, if there is no match therebetween, the dialogue processor 280 performs the process of S1717 again. Since this processing is the same as the first embodiment, explanations will be omitted. As a result of the determination in S1719, if there is a match therebetween, the dialogue processor 280 fixes the process executable by the in-vehicle apparatus 101 (S1720). Since this processing is the same as the first embodiment, explanations will be omitted.

Here, the determining section 1501 terminates the processing in any of the following cases: when there is no noun substitute included as a result of the determination in S1703, when there is no character string included that is identical to the character shown on the signboard placed in the forward direction, as a result of the determination in S1705, when there is no character string included that is identical to the character shown on the signboard placed in the backward direction, as a result of the determination in S1711, when there is no character string included that is identical to the character shown on the signboard within the predetermined range, as a result of the determination in S1716. It is to be noted here that in the cases above, the output processor 281 may output information notifying that any response is not available, to the speaker 208, the display 209, or the like.

As a result of the determinations in S1708, S1714, and S1719, if there is a match, the navigation processor 282 executes a process decided by the dialogue processor 280 (S1721), and then terminates the process. Since this process is the same as the first embodiment described above, it will not be explained.

As thus described, by restricting the signboard to be designated according to a noun substitute, it is possible to enhance efficiency in specifying the signboard.

Preferred embodiments of the present invention have been explained in detail with reference to the accompanying drawings. However, a specific configuration is not limited to these examples, and it should be understood that disclosed embodiments may be changed without departing from the scope of the invention.

By way of example, in the embodiments above, the speech recognition function, determining function, dialogue scenario generating function, and the like are incorporated in the in-vehicle apparatus 101. However, the present invention is not limited to this configuration, and the center server 102 may incorporate these elements.

What is claimed is:

1. An in-vehicle apparatus mounted in a vehicle, connected to a communication device, and provided with a speech recognition function, comprising, a signboard information data store that stores a plurality of signboard information items each including a signboard position of a signboard located at a position so as to be visible from a road on which the vehicle is driving and a character string shown on the signboard, a signboard information acquiring component that automatically obtains a signboard information item for a signboard including the signboard position of the signboard located at a position so as to be visible from the road where the vehicle is driving and the character string shown on the signboard and, upon obtaining the signboard information item, stores the obtained signboard information item in the signboard information data store, an image capturing component that controls a camera in accordance with information indicating a line-of-sight of a user and extracts, from an image taken by the camera for a signboard captured in the image, a signboard position of the signboard indicating a location visible from the road on which the vehicle is driving where the image is taken and a character string shown on the signboard, and stores a signboard information item for the signboard that includes the extracted signboard position and the extracted character string in the signboard information data store, a noun substitute data store that stores a noun substitute, a speech processing component to which speech is inputted, the speech processing component, upon determining that the inputted speech includes the noun substitute, selects, comparing the inputted speech with each of the signboard information items stored in the signboard information data store, a signboard information item from the signboard information data store for which the signboard position is within a predetermined range from a current position of the vehicle and for which at least a part of the character string matches a part of the speech inputted, and determines a response for confirming the character string being included in the selected signboard information item, and an output unit that provides an output indicating the response.

2. The in-vehicle apparatus according to claim 1, wherein, the communication device is a beacon transmitter.

3. The in-vehicle apparatus according to claim 1, wherein, the communication device is an RFID installed on the signboard, and the signboard information acquiring component uses a reader to obtain the signboard information item including the signboard position of the signboard located at a position so as to be visible from the road on which the vehicle is driving, and character string shown on the signboard.

4. The in-vehicle apparatus according to claim 1, wherein, the noun substitute data store associates and stores the noun substitute, and a relative azimuth for a traveling direction of the vehicle, when the noun substitute is included, and when the noun substitute is included in the speech inputted by the speech processing component, the speech processing component reads the relative azimuth associated with the noun substitute from the noun substitute data store, selects, from each of the signboard information items stored in the signboard information data store, a signboard information item for which the signboard position is within a predetermined range from the current position of the vehicle in the relative azimuth read, and for which at least a part of the character string matches a part of the speech inputted, and determines a response for confirming the character string being included in the selected signboard information item.

* * * * *